United States Patent [19]
Fix, Jr.

[11] Patent Number: 5,927,910
[45] Date of Patent: Jul. 27, 1999

[54] AUTOMATED DRILLING APPARATUS

[76] Inventor: John William Fix, Jr., 5185 SW. 61st Dr. (P.O. Box 1847), Palm City, Fla. 34991

[21] Appl. No.: 08/922,867

[22] Filed: Sep. 3, 1997

Related U.S. Application Data

[60] Provisional application No. 60/025,502, Sep. 5, 1996.

[51] Int. Cl.⁶ ..................................................... B23B 27/22
[52] U.S. Cl. ............................................. 408/17; 408/130
[58] Field of Search ................................ 408/33, 14, 17, 408/97, 124, 125, 130, 702

[56] References Cited

U.S. PATENT DOCUMENTS

| | | | |
|---|---|---|---|
| 4,123,188 | 10/1978 | Deremo et al. | 408/17 |
| 4,362,444 | 12/1982 | Watkins | 408/14 |
| 5,073,068 | 12/1991 | Jinkins et al. | 408/130 |
| 5,215,416 | 6/1993 | Dessouky | 408/17 |
| 5,328,302 | 7/1994 | Eckman | 408/17 |
| 5,533,842 | 7/1996 | Johnson et al. | 408/130 |

OTHER PUBLICATIONS

Frank Yeaple: Fluid Power Design Handbook,1990;Second Edition; pp. 391–527;Marcel Dekker,Inc.;New York,NY.

*Primary Examiner*—Andrea L. Pitts
*Assistant Examiner*—Adesh Bhargava
*Attorney, Agent, or Firm*—Sankey & Luck, L.L.P.

[57] ABSTRACT

Automated drilling apparatus. This invention relates generally to an automated drilling apparatus, with its control system and other operating components uniquely integrated within an external housing, while operating via low pressure air sources or other fluid power sources commonly found in industrial settings, and methods for its use. The automated drilling apparatus could be adaptable to a wide range of hand-held or machine mounted automated drilling and machining operations because its unique integrated technology provides for a programmable lightweight small machine tool which will be effective in industrial settings. A prototype automated drilling apparatus has been effectively evaluated with test results proving the invention effective for industrial use. The automated drilling apparatus includes the following integrated components: an external housing, an internal drill piston housing, a rotatable drive means, a chuck assembly, an engagement mechanism, an alignment shroud, and a programmable control means.

39 Claims, 15 Drawing Sheets

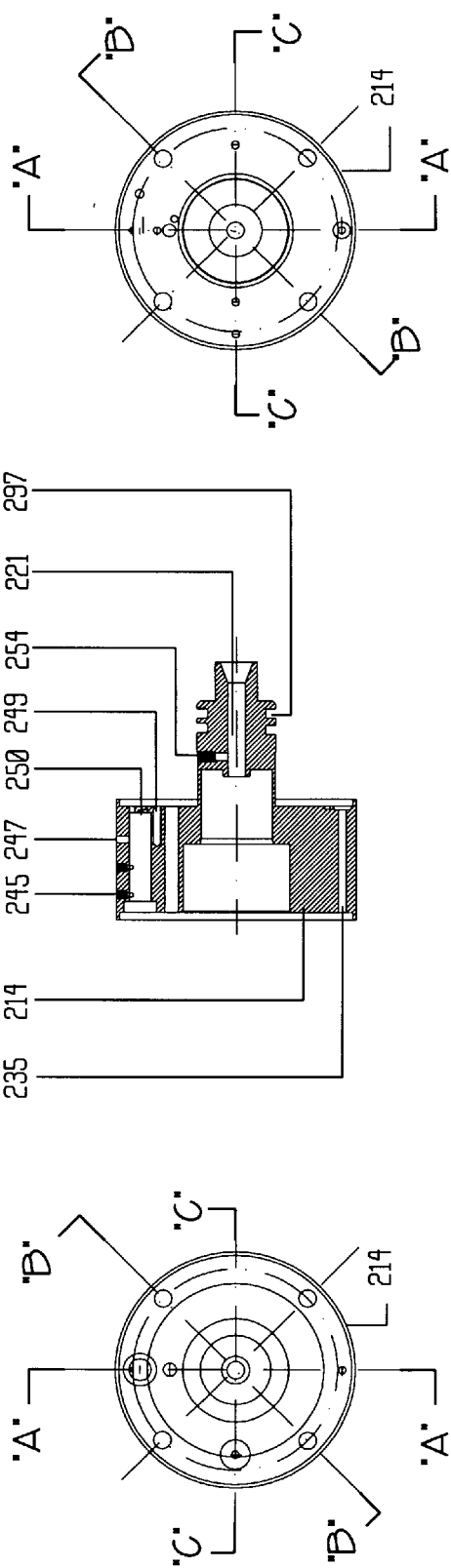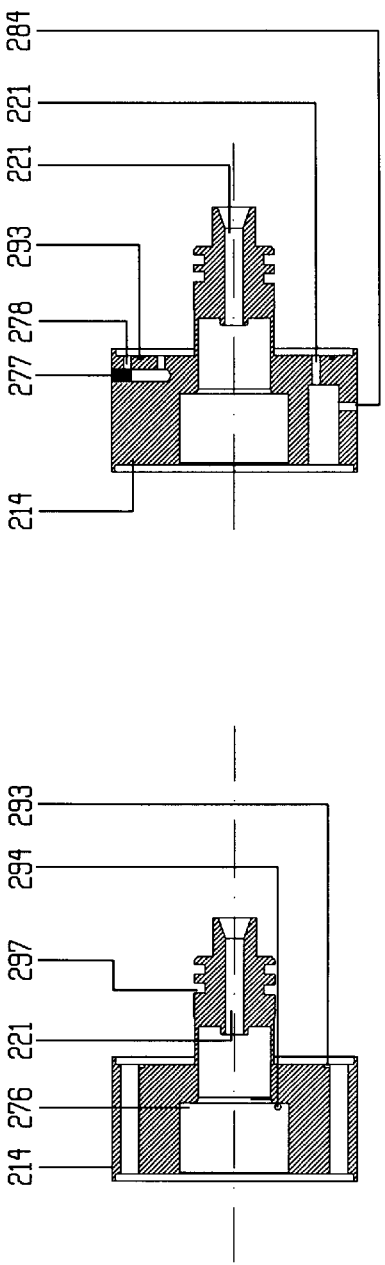

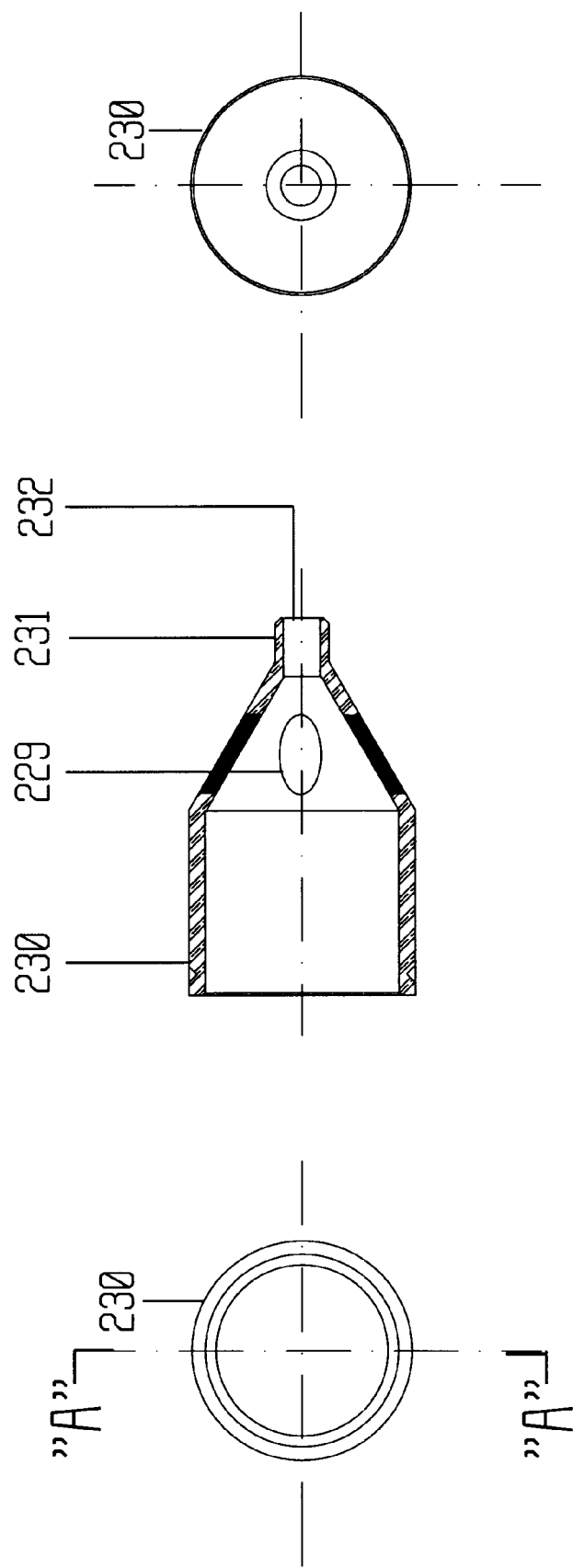

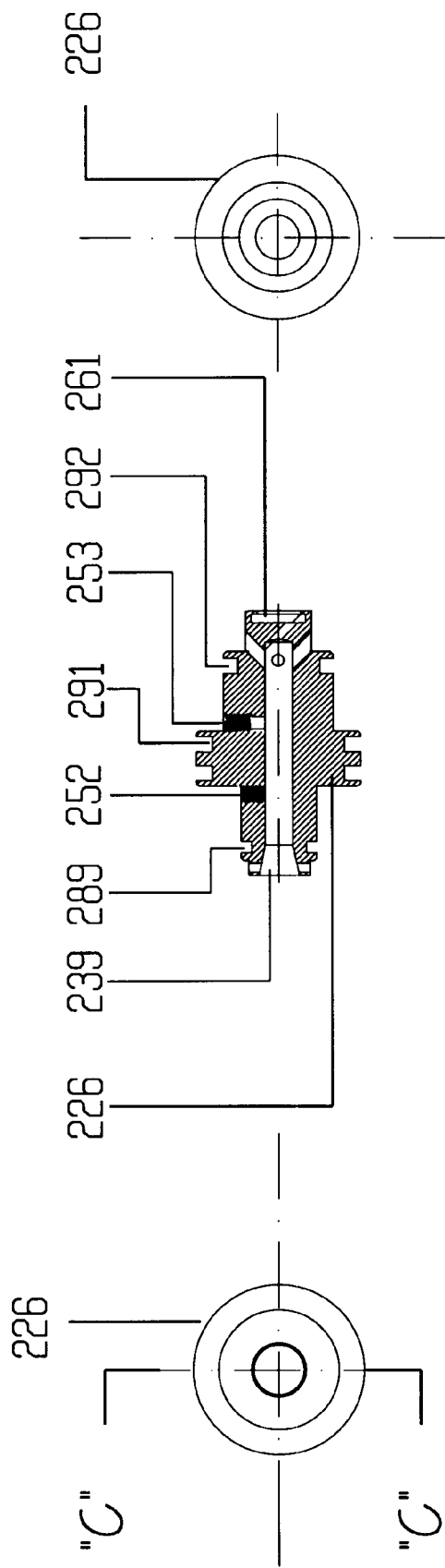

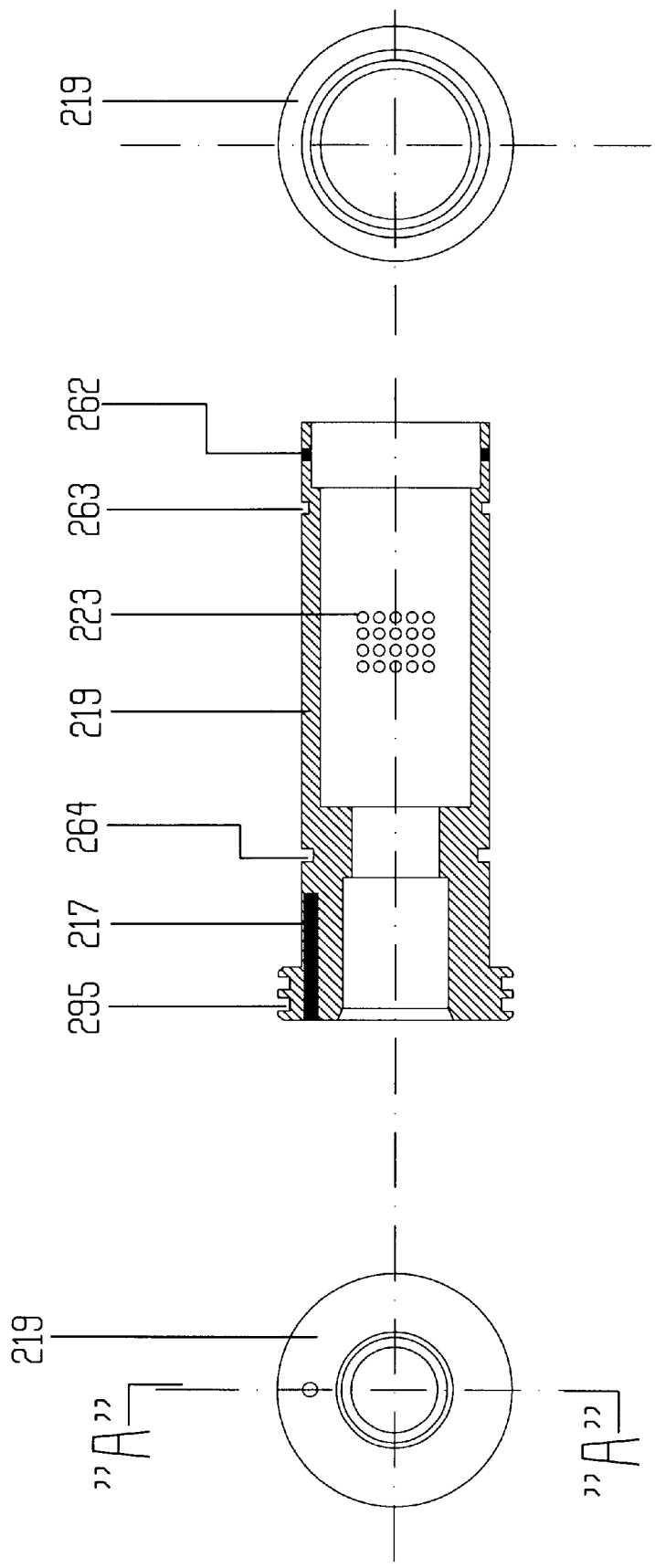

AUTOMATED DRILLING APPARATUS

REFERENCE TO PROVISIONAL APPLICATION

Pursuant to 35 U.S.C. §119(e), this application derives from a provisional application for the same invention filed on Sep. 5, 1996, provisional Ser. No. 60/025,502.

BACKGROUND OF THE INVENTION

1. Technical Field

This invention relates generally to an automated drilling apparatus, with its control system and other operating components uniquely integrated within an external housing, while operating via low pressure air sources or other fluid power sources commonly found in industrial settings, and methods for its use. This invention has many advantages when compared to the accepted practice of designing componentized feed drills. Many such advantages are described herein this patent application including the unique ability to achieve significant size and weight reduction in a programmable machine tool that has proven effective in drilling, grinding and milling operations. A prototype automated drilling apparatus has been effectively evaluated with test results proving the invention effective for industrial use.

2. Background of the Invention

Industry utilizes many different types of tools and machinery to perform various drilling operations, manufacturing, repair and other industry related functions. Some of the tools and machinery are portable to be carried to the work site and some are too heavy and must be permanently installed in place on site. Automation of industrial tools and equipment has been on the forefront of the industrial community agenda for many years. In general, industry will continue to develop robotic type control systems that utilize position, timing and other multifaceted control input signals that are fixed in a relationship or variable and programmable and whose inputs can be fed back to operate cylinders, air motors, actuators and other output devices that respond to automated manufacturing process requirements, air tool operation, machine operation and safety requirements and control of other industrial applications.

The automated drilling operations for manufacturing process requirements, machine operation and other industrial applications is generally achieved by the use of off-the-shelf components that are expensive, heavy, cumbersome and, many times, too large to meet the needs of a particular application that industry requires. Some of the problems with the existing automated pneumatic drilling apparatuses include the incompatibility of the components with one another and, many times, the inability to use single source low pressure air sources commonly found in industrial settings, and methods for its use. For example, some of the components may require specially treated compressed air at low pressures and with special filtration, while other system components may require compressed air at higher pressures and flows where costly filtration and pressure regulation is not a concern.

A typical pneumatic drill may include electrical or hydraulic system components to make the control system operable, causing the need for electrical and/or hydraulic controls in addition to the compressed air source. It has also been found that many automated pneumatic drilling apparatuses made available as off-the-shelf hardware are made up of various incompatible control system components.

Typically, without an integrated flow impedance matched system, an input-output control system may function well under one operating environment, but fail to provide the desired operational characteristics once the operation environmental conditions are changed. One solution to the above-outlined problems is the integration of components which are flow impedance matched, that is to suggest that all components are compatible as to pressure and flow when installed and operational to make the automated drilling apparatus workable and efficient over a wide range of manufacturing and industrial applications.

John William Fix, Jr., the inventor of this invention filed a U.S. Provisional Patent Application #60/019,648 in 1996, for an "Automated Integrated Input-Output Control System Apparatus" and converted his provisional application to a Regular U.S. Patent Application in 1997. One use of such a robotic control system would be for manufacturing, or other machining type operation. Prototype tests of the "Automated Integrated Input-Output Control System Apparatus" have proven the automated integrated input-output control system effective for industrial use. John William Fix, Jr. also invented a robotic fusion bonding apparatus that can effectively be used at remote industrial plant operations using compressed plant air as its power source. A patent was applied for on Jun. 6, 1995, (U.S. patent application Ser. No. 08/470,257; "Automated Fusion Bonding Apparatus"). Prototype and production model evaluation tests of the "Automated Fusion Bonding Apparatus" have proven the automated integrated input-output control system effective for industrial use for the past several years.

The automated drilling apparatus provides for programming the depth of a hole to be drilled in any specific object and permitting the operator to consistently drill holes of accurate depth during each operation of the apparatus. The operator can change the programmed depth and force levels on the drill bit by programmable controls. Safety features are integrated into the control system to prevent inadvertent start-up. Programmable inputs can also be external and can come from other machinery, electrical, hydraulic and mechanical interface controls. The automated drilling apparatus can be utilized as a lightweight small hand held tool or mounted to machinery for an in-plant manufacturing operation. The automated drilling apparatus is scalable in design in that the same design concept can be used to make larger more powerful apparatuses and smaller less powerful automated drilling apparatuses.

The advantages of an automated drilling apparatus include, but are not limited to: (1) programmable position sensing can be designed to be more accurate because it is pressure flow impedance matched; (2) a common compressed air source regulator can be used, as opposed to separate pressure regulation supply sources, thus eliminating the requirement of separate pressure regulators, air lines, fittings, valves and other related components; (3) compressed air filtration problems are eased so that microfilters may not be required in the sensing and amplification systems; (4) system integration permits ease of installation and eliminates calculations or guess work if used in a manufacturing equipment operation; (5) installation in a manufacturing operation can be completed by persons not trained in the control technology by following easy instructions for setting up the automated drilling apparatus in an intense industry setting where system installation and change out is critical to productivity; (6) the automated drilling apparatus can be fabricated from a wide range of materials, and is suited for fabrication from aluminum, which will result in a lightweight industrial control component; (7) persons installing the automated drilling apparatus do not require special skills in matching of fluid power components; (8)

operators are not required to have special skills in starting or stopping the operation; (9) the automated drilling apparatus is easily automated for mass production; (10) input control components can be interchanged easily for greater flexibility and servicing; (11) the automated drilling apparatus utilizes a multipurpose shroud that provides safe operations while serving as a drilling guide; (12) the automated drilling apparatus can be programmed to provide programmable pecking drilling operations, whereby all programmable control systems are maintained within the same housing; (13) installation of the automated drilling apparatus is made rapidly, compared to other componentized or more cumbersome automatic drilling apparatus installations.

A number of disadvantages exist with the conventional automated drilling apparatuses, which are basically designed from antiquated technology when considering components such as sensors, timers, pilot operated air valves, hydraulic check valves, and other input or output devices. The problem arises when attempting to create the ideal robotic automated drilling system. For example, some of the limitations include, but are not limited to: (1) off-the-shelf automated drilling systems are generally too heavy, particularly in hand-held operations; (2) off-the-shelf conventional automated drilling apparatus pilot operated air valves are made to be controlled from a specific range of input pressures and flows and provide only a specific range of output pressure and flow; (3) incompatibility of the components making up conventional automated drilling apparatuses with one another may not permit the use of single source low pressure air sources commonly found in industrial settings; (4) some of the components may require low pressures and the use of special regulators, while other system components may require compressed air at high pressures; (5) special filtration systems may be required for some system components, while others can use standard industrial filtration systems; (6) some of the components may fail if oil is utilized as a lubricant in the operating system air, while other system components may fail if plant air is not supplied with a lubricant; (7) some system components may require specially treated plant air at low pressures and the use of special regulators, while other system components may require plant air at higher pressures and flows; (8) in rigorous applications such as those present in the industrial environment, the electronic controls are often prone to failure; (9) hydraulic, electrical and mechanical input-output systems are not always easily integrated with pneumatic systems; (10) the presence of electronic controls requires the presence of an electrical power source, which is often unavailable, impractical or hazardous in the industrial setting; (11) most off-the-shelf input-output control systems are not scalable and, therefore, cannot be miniaturized or effectively made large enough to meet universal industrial applications; (12) the end-user must make concessions in power requirements, control system efficiency, speed, and costs; (13) there are programmable control limitations; (14) pneumatic automated drills do not generally permit pecking operations and automatic straight drilling with the same apparatus; and (15) end-users must face difficult use limitations and field setup time constraints.

Thus, while most off-the-shelf automated drilling apparatuses offer significant advantages over the operator dependent conventional drills, there has been a need in the art for an automated drilling apparatus that offers the end-user a wide range of operating features with multifunctional programmable capability.

There has been an additional need in the art for an automated drilling apparatus which can be used in a variety of applications, so as to obviate the need for many different and unmatched input-output components.

There has also been a need in the art for an automated drilling apparatus with expanded capabilities with respect to associated programmable controls to include both straight and pecking drilling programmable operations.

There has also been a need in the art for an automated drilling apparatus with a safety shroud that protects the operator, while enhancing drilling operation by various snap-on adapters which provide for a drilling guide.

There has also been a need in the art for an automated drilling apparatus with a safety shroud that protects the operator, while enhancing drilling operation by various adapters which provide for a support while performing drilling operations.

There has also been a need in the art for an automated drilling apparatus that can be utilized as a hand-held portable robotic tool that meets industry's needs, while also adapting to robotic machine operations.

There has also been a need in the art for an automated drilling apparatus, which is impedance matched, so the end-user does not have to search the industry for an automated drilling apparatus that will match other machining operations.

There has been an additional need in the art for an automated drilling apparatus which does not require complex componentization.

There has been a further need in the art for an automated drilling apparatus which does not require different pressure regulators of air filtering systems for individual components.

There has also been a need in the art for an automated drilling apparatus that can be easily installed or used without special training in fluid control systems.

There has also been a need in the art for an automated drilling apparatus that can be designed for specific applications and mass produced at an acceptable cost and can be fabricated from a wide range of materials, and is suited for fabrication from aluminum which will result in a lightweight industrial control component, whether it be attached to a machine or used as a hand-held tool.

There has been an additional need in the art for an automated drilling apparatus that houses sensing, timing and other input features in one integrated housing, whereas input components can be interchanged quickly and are easily pressure flow impedance matched.

SUMMARY OF THE INVENTION

The present invention solves significant problems in the art by providing an automated drilling apparatus and a method for its use. Generally described, the present invention provides for an automated drilling apparatus that is pressure flow impedance matched and can be hand-held or be adapted to manufacturing operations and other industry control operations, while operating from pressurized air sources commonly available at industrial facilities, automotive repair shops, and other manufacturing plants. The automated drilling apparatus generally includes unique sensing devices, timing devices, sensor transducer devices, pressure-flow regulating devices, differential pressure air valve, integral housing, safety start devices and start valve, many of which are independent of the other, thus permitting limited operating or complete programmable automated drilling apparatuses to be offered to the industrial market.

In a preferred embodiment for drilling during a manufacturing operation or industrial application, the automated drilling apparatus provides for robotic operation or industrial operation, wherein the process for robotic control comprises operator start-stop features, programmable timing, sensing and safety functions to control and provide drilling operations, either through machine operations or through operator hand-held applications, whereas input devices, (sensors, timers, etc.,) provide signals to cause the automated drilling apparatus to operate under internal or external programmable conditions which can be manually programmed or programmed by external devices, such as hydraulic motors, electrical pressure switches, and other such input devices.

The apparatus includes a housing, integrated sensors, integrated timers, external input ports, diagnostic pressure ports, external output ports, a primary differential flow valve, air motor, drill chuck, differential pressure force piston and other related components. The primary differential flow valve provides for turning on and shutting off of the primary air flow to the output system. The external input ports provide for using external input devices, such as isolated pneumatic sensors and timers or pneumatic inputs from electrical, mechanical or hydraulic input systems. The external output ports provide for external devices, such as isolated pneumatic, electrical, mechanical or hydraulic systems that can adapted to a pneumatic pressure or vent signal. The air motor provides for the rotational motion required to turn the drill bit. The drill chuck provides for a means to hold the drill. The differential pressure force piston serves as both a housing for the air motor and as an actuator to move the drill bit both forward and backward axially within the housing to facilitate the automated drilling process.

The apparatus further includes an integrated programmable control system features to regulate the drilling force level control, setting the drill depth position sensors, setting the pecking timing conditions, setting the safety features and position sensors to cause the primary differential flow valve to open and close at specific times. The control system is operably engaged to the primary differential flow valve means which is slidably disposed within the housing, wherein the primary differential flow valve means supplies fluid flow to the control system, axial drive cylinders and the drill motor devices. The apparatus further includes an axial hand grip to permit the operator to grip the automated drilling apparatus when using as a hand-held robotic drill.

In other aspects, the apparatus further includes a support means, removably engageable to the housing, which is adapted to attach the automated drilling apparatus to any industrial platform for security reasons.

In another preferred embodiment of the invention, the automated drilling apparatus, the apparatus further includes a pistol grip geometry to meet specific industrial hand-held applications, whereas the pistol grip permits the operator to grip the automated drilling apparatus when using as a hand-held robotic drill. When considering robotic control of manufacturing operations or industrial operations, the robotic control comprises operator start-stop features, programmable timing, sensing and safety functions to control and provide automatic drilling operations using standard plant air normally available, whereas input devices (sensors, timers, etc.,) provide signals to cause the differential flow valve to open and close and, thus, cause the drilling operation to proceed upon manual operator start-up mode or from the input signals such as mechanical, hydraulic, and electric pressure switches, or from mechanical devices.

The apparatus includes: (1) a quick disconnect assembly through which plant air flows to the automated drilling apparatus, the quick disconnect assembly releasably coupled to a fitting threaded into the housing; (2) a primary differential flow valve disposed within the housing to turn on and shut off flow of the plant air; (3) a plurality of pressure-flow passages disposed within the housing through which the plant air flows to output devices and the ambient atmosphere as exhaust; (4) a start valve connected to the housing which starts circulation of the plant air to the programmable system for selectively starting circulation of the pressurized fluid to the apparatus to open the primary differential flow valve means to permit flow to output devices; (5) diagnostic ports disposed within the housing which measure pressure throughout the programmable control system; (6) a programmable vernier depth controller system sensor means externally coupled to the housing which programs a desired drill bit position in an industrial or machine tool application and measures the position in a fixed relationship to the safety shroud or to a specific component in an industrial manufacturing application and changes circulation of the plant air to the output device when the preprogrammed position is reached; (7) a programmable machine tool axial force regulation system that presets the amount of axial force applied to the drill bit or machine tool and can be programmed to provide multi-force level related to position of the vernier depth controller system; (8) a safety port valve connected to the housing which overrides the start valve and the programmable control system, preventing inadvertent start-up by selectively inhibiting the circulation of the pressurized fluid to the apparatus to shut off fluid flow to output devices from the primary differential flow valve means; (9) a programmable control system for controlling the operation of the apparatus including control flow passages and control elements; (10) an upper pressurization chamber connected to the control flow passages and the primary differential flow valve means; (11) a lower pressurization chamber connected to the control flow passages and the primary differential flow valve means; (12) an inlet pressurization chamber connected to the control flow passages and the primary differential flow valve means; (13) a safety shroud to provide operator protection during operation; and (14) external input control ports.

In still other aspects of this embodiment, the apparatus includes: (1) a programmable safety means disposed within the housing which overrides the control system to prevent start-up of the automated drilling apparatus without operator coding; (2) a start valve which, when released, provides for a safety means disposed within the housing which overrides the control system to immediately shut the system down upon operator's release of the start button; and (3) a programmable timing means disposed within the housing which overrides the control system to provide for a predetermined timed pecking operation, whereas the drill bit is automatically moved in and out the drilled hole until the depth sensor for the automated drilling apparatus senses the programmed depth and commences the shut-down mode, after the start valve has been depressed or an external start signal has been received.

In yet another embodiment of the invention, the various control components previously described in this Summary of the Invention, may be included or eliminated depending on the end-use of the automated drilling apparatus. An advantage of the present invention is that the operator is removed from making critical decisions, which would demand complex calculations once the programmable functions are set.

In one aspect of this embodiment, the compressed air is pressurized and is supplied to the programmable control system through a pressure flow line releasably coupled to the housing inlet fitting. In other aspects, the programmable control system components may be pneumatic, mechanical, hydraulic, electrical or digital fluidic logic devices or analog fluid logic devices. Accordingly, it is an object of the present invention to provide a programmable automated drilling apparatus. It is another object of the present invention to provide an integrated automated drilling apparatus which works independently of the operator during the control process after the operator depresses the start button. It is yet another object of the present invention to provide an automated integrated drilling apparatus which does not have separate unmatched control system components coupled by one form or another.

BRIEF DESCRIPTION OF THE DRAWINGS

FIG. 7A is a side view taken along the lines of A—A of FIG. 7B of a preferred embodiment of the intermediate external housing of the automated drilling apparatus of the present invention.

FIG. 7B is a left proximal end view of the intermediate external housing of the automated drilling apparatus of the present invention.

FIG. 7C is a right distal end view of the intermediate external housing of the automated drilling apparatus of the present invention.

FIG. 7D is a side view taken along the lines of B—B of FIG. 7B of another portion of the intermediate external housing of the automated drilling apparatus of the present invention.

FIG. 7E is a side view taken along the lines of C—C of FIG. 7B of another portion of the intermediate external housing of the automated drilling apparatus of the present invention.

FIG. 9A is a side view taken along the lines of A—A of FIG. 9B of a preferred embodiment of the safety guide alignment shroud of the automated drilling apparatus of the present invention.

FIG. 9B is a left proximal end view of the safety guide alignment shroud of the automated drilling apparatus of the present invention.

FIG. 9C is a right distal end view of the safety guide alignment shroud of the automated drilling apparatus of the present invention.

FIG. 10A is a side view taken along the lines of A—A of FIG. 10B of a preferred embodiment of the supply fluid valve piston of the automated drilling apparatus of the present invention.

FIG. 10B is a left proximal end view of the supply fluid valve piston of the automated drilling apparatus of the present invention.

FIG. 10C is a right distal end view of the supply fluid valve piston of the automated drilling apparatus of the present invention.

FIG. 11A is a side view taken along the lines of A—A of FIG. 11B of a preferred embodiment of the drill piston housing of the automated drilling apparatus of the present invention.

FIG. 11B is a left proximal end view of the drill piston housing of the automated drilling apparatus of the present invention.

FIG. 11C is a right distal end view of the drill piston housing of the automated drilling apparatus of the present invention.

DETAILED DESCRIPTION OF THE PREFERRED EMBODIMENT

Figure 1:
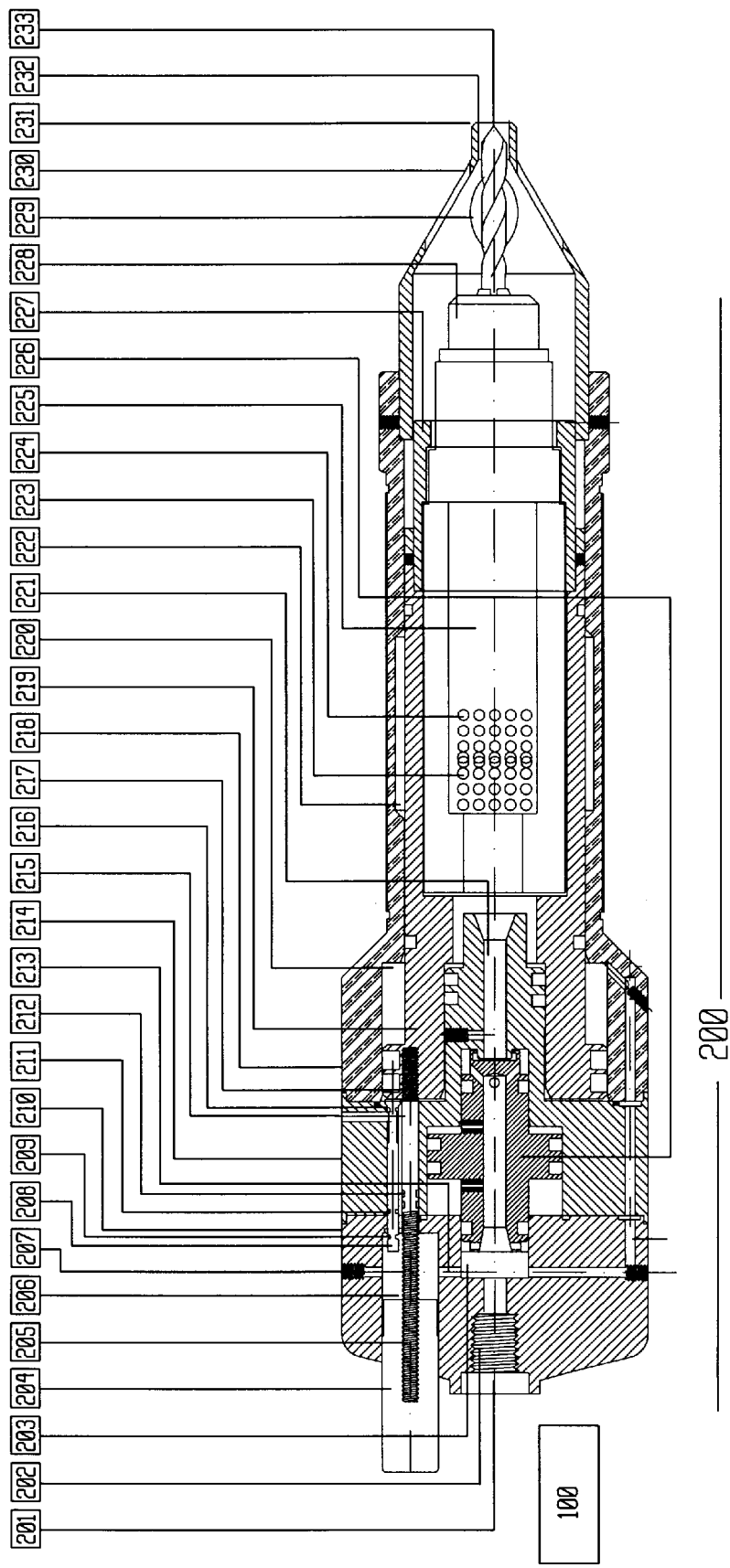
FIG. 1 is First cross-sectional side view of a preferred embodiment of the automated drilling apparatus {in the normal shut-off position} of the present invention, including, but not limited to the mechanical vent pin sensor mechanism option.
Figure 2:
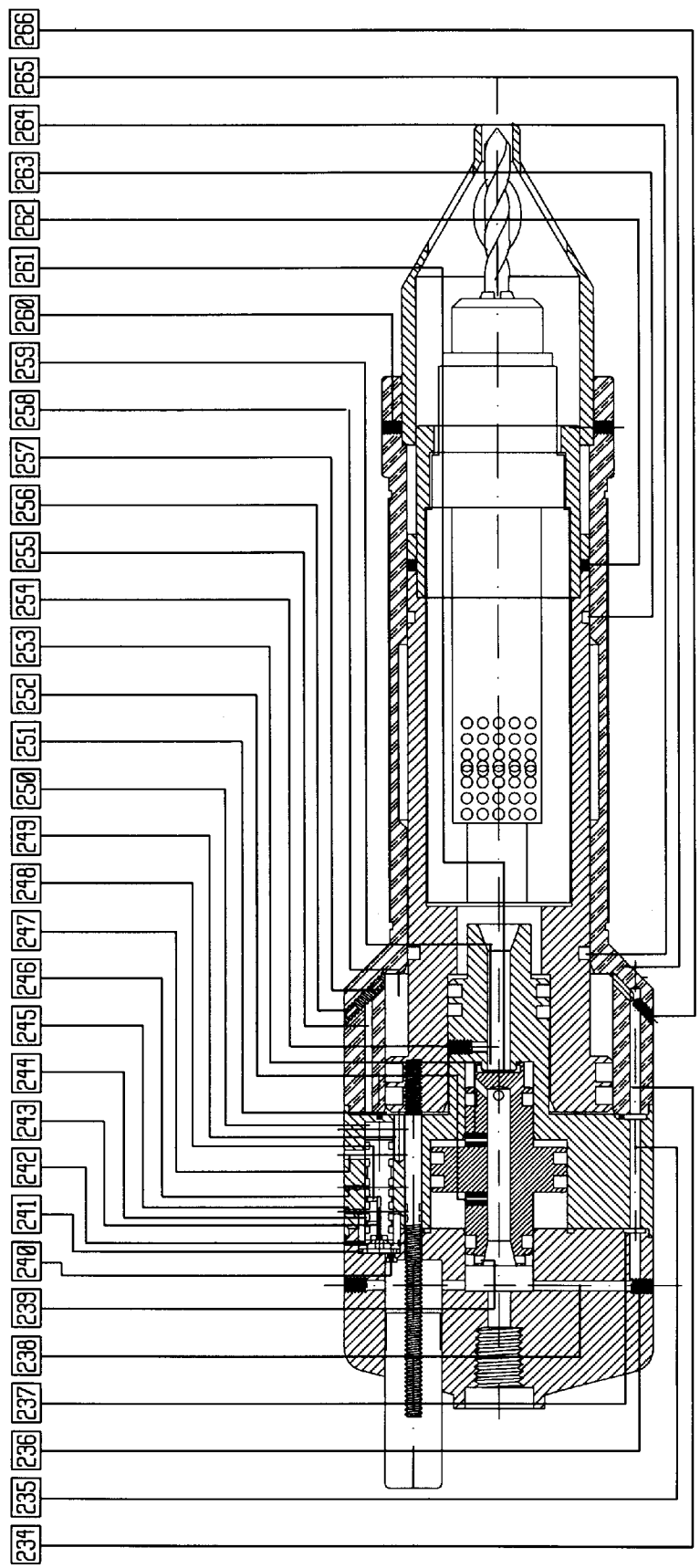
FIG. 2 is Second cross-sectional side view of a preferred embodiment of the automated drilling apparatus {in the normal shut-off position} of the present invention, including, but not limited to the primary controller piston assembly option.
Figure 3:
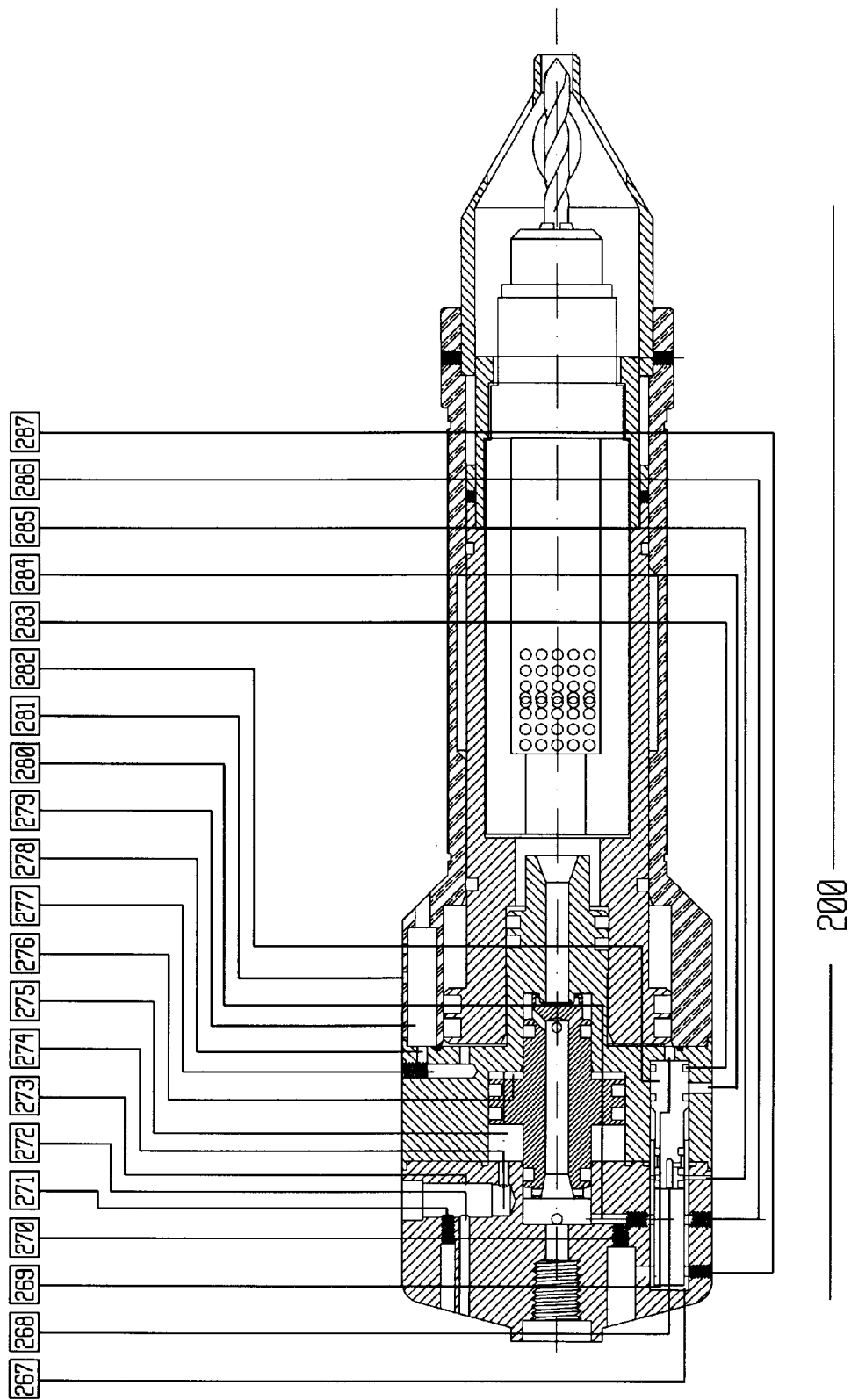
FIG. 3 is Third cross-sectional side view of a preferred embodiment of the automated drilling apparatus {in the normal shut-off position} of the present invention, including, but not limited to the start valve and pecking controller system.
Figure 4:
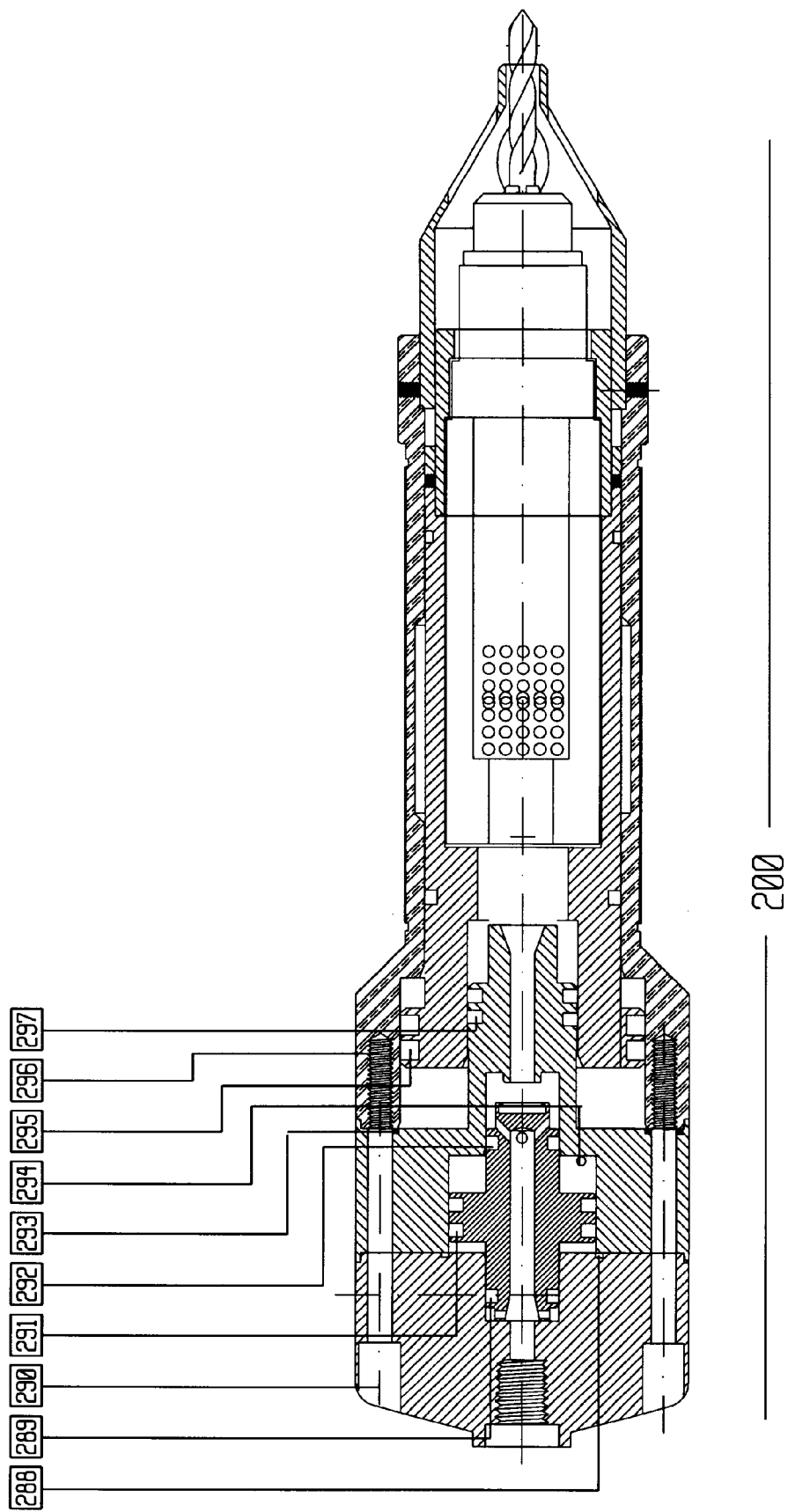
FIG. 4 is Fourth cross-sectional side view of a preferred embodiment of the automated drilling apparatus {in the activated open position} of the present invention, including, but not limited to the securing of the external housing sections.

Referring initially to FIGS. 1–15 of the drawings, in which like numerals indicate like elements throughout the several views, a preferred embodiment of the automated drilling apparatus of this invention is generally illustrated by reference numeral 200.

A automated drilling apparatus 200 is set forth in FIGS. 1–5, and generally includes a compressed air supply system 100, a upper external housing 210, a intermediate external housing 214, a lower external housing 218, a drill piston housing 219, a drill piston housing air motor retainer 227, a supply fluid valve piston 226, a safety guide alignment shroud 230, a fluid driven rotatable motor 225, a machine tool chuck and gear assembly 228, a machine cutting or drilling tool 233 and a number of unique automated control system components and other related components. Supply fluid valve piston 226 is axially and slideably disposed in both upper external housing 210 and intermediate external housing 214. Drill piston housing 219 is axially and slideably disposed in lower external housing 218. These components are integrally coupled in a manner described below.

The machine cutting or drilling tool 233 will be referred to, in a generic sense, as a drill bit, as will many of the other elements of automated drilling apparatus 200 use the term drill, but it is envisioned by the inventor that this apparatus can be used for drilling, grinding, milling and other machining operations. The compressed air supply system 100 may be a plant air supply system, another form of compressed air or other compressed gaseous fluid.

Referring to FIGS. 1–15, and looking at the entrance compressed fluid flow conditions at initial connection, compressed air supply system 100 provides for the source of pressurized fluid energy, although other gaseous fluid can be effectively utilized to operate the automated drilling apparatus 200. Compressed air supply system 100 includes compressed air, pressure regulators, lubricators, air dryers, air filters as may be appropriate, air hoses, quick disconnects and inlet fitting adaptable to the automated drilling apparatus 200. The supply source quick disconnect (not shown) allows greater ease in transportation and set up of the automated drilling apparatus 200, as well as emergency disconnect of the power source when an immediate shut down might be necessary. The supply source quick disconnect is installed via mating threads in a supply fluid inlet 201 and a supply fluid inlet threads 202.

The automated drilling apparatus 200 is robotic in operation and has the ability to send and receive pressure and vent signals from within and from other electrical, hydraulic, pneumatic and mechanical systems so as to provide various pressure-flow outputs through special porting (not shown) that is connected to a start valve 273 and various flow passages as described herein. Automated drilling apparatus 200 is a pressure flow impedance matched device that can be manually controlled when hand-held by an operator or automatically or manually controlled when attached to industrial machinery when made an integral part of an air tool or other industrial equipment so as to feed back positioning information to automated drilling apparatus 200.

Figure 5A:
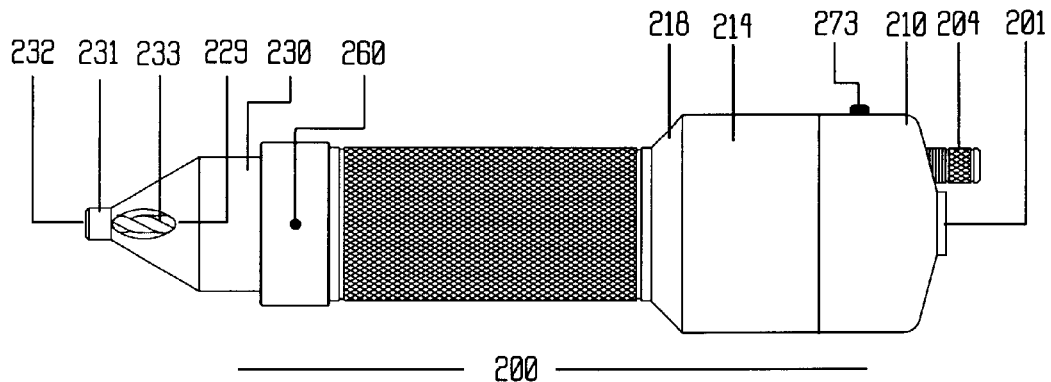
FIG. 5A is an outline drawing side view of a preferred embodiment illustrating an axial grip hand-held option of the automated drilling apparatus of the present invention .
Figure 5B:
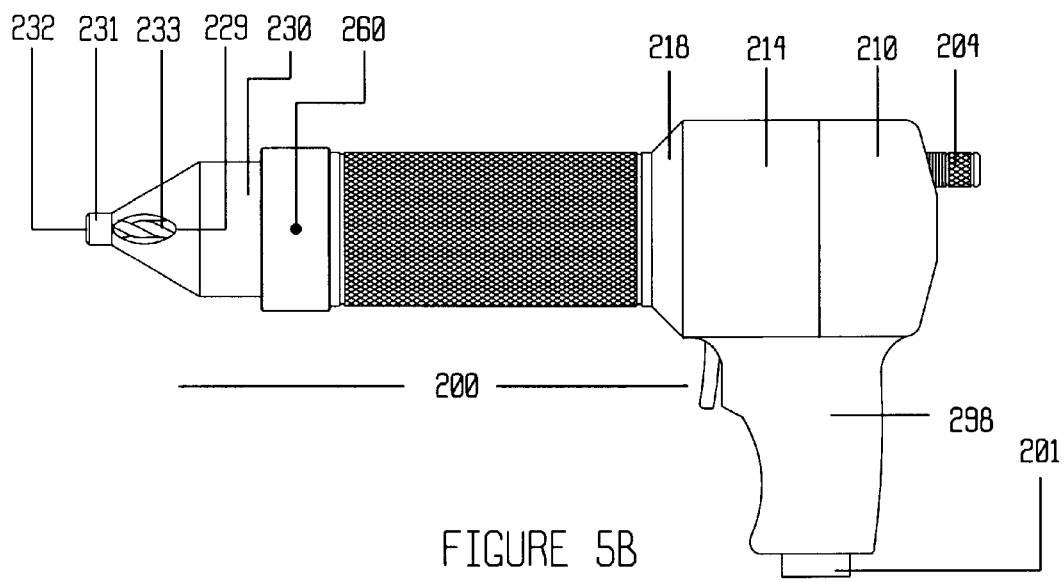
FIG. 5B is an outline drawing side view of another preferred embodiment illustrating a pistol grip hand-held option of the automated drilling apparatus of the present invention showing.

In a preferred embodiment, supply fluid inlet 201 with supply fluid inlet threads 202 located in the upper external housing 210, is located at the proximal end in a preferred embodiment, but can be located approximately one third of the distance toward the distal end, considering the integrated safety features of a pistol grip handle with start valve 298 shown in FIG. 5B. The upper external housing 210, intermediate external housing 214, lower external housing 218, drill piston housing 219, and supply fluid valve piston 226 may be formed of aluminum, composite materials, molded aluminum, plastic or other strong, lightweight materials. While in a preferred embodiment, the geometry of the automated drilling apparatus 200 is generally cylindrical, other geometries are applicable in some cases. Most of the components can be machined to custom considerations, but some off-the-shelf components will be illustrated as examples in this detailed description.

By further reference to FIGS. 1–15, looking at the secondary fluid flow conditions and considering the initial connection of compressed fluid flow, fluid entering supply fluid inlet 201 is channeled, after entering a supply fluid valve upper piston chamber 203, to a supply fluid valve piston inlet and flow passage 239, a drill piston lower chamber upper flow passage 238, a vernier depth controller flow passage with plug 207, and a pecking controller flow meter valve supply inlet 280, the flow geometry to the supply fluid valve upper piston chamber 203 permits the required compressed air supply system 100 air flow to be maintained at operational nominal inlet pressures of approximately 80 to 120 pounds per square inch, with flow volume requirements, depending on the size of the automated drilling apparatus 200 and/or its output devices, generally within the approximate fluid flow rate range of 3–25 cubic feet per minute. When compressed air supply system 100 is connected to the automated drilling apparatus 200, the air is distributed from supply fluid inlet 201 in a manner to assure that automated drilling apparatus 200 returns to its normal shut-off start position.

Referring to FIG. 1, then FIGS. 1–15, and considering initial connection of compressed fluid with the preferred embodiment first option of utilizing a drill piston vent pin 208, compressed air from supply fluid valve upper piston chamber 203 is supplied to and travels through to a vernier depth controller flow passage 213 and into a vernier depth controller bore area 206. Since drill piston vent pin 208 is slideably movable in an axial direction, a drill piston vent pin retainer o'ring 209 keeps drill piston vent pin 208 from moving too far toward drill piston housing 219. A drill piston vent pin o'ring 211 prevents pressurized fluid flow from entering a drill piston vent pin vent interconnecting flow passage 215 and escaping to the atmosphere. A drill piston vent pin vent sealing o'ring 216 maintains pressurization in a drill piston upper chamber 251. Vernier depth controller flow passage with plug 207 also maintains pressure in the vernier depth controller bore area 206.

A vernier depth controller 204 is cylindrical in shape and is inscribed with indicated markings for reference to the upper external housing 210 which is used in conjunction with drill piston vent pin 208 to limit the axial movement of drill piston housing 219 to a predetermined programmed distance, when traveling on a vernier depth controller threaded rod 205, as required for a specific drilling or milling operation. Vernier depth controller 204 design also includes specific flow geometry to permit air flow even when bottomed out in vernier depth controller bore area 206. Pressurization in the vernier depth controller bore area 206 is also maintained by a vernier depth controller threaded rod o'rings 212. Vernier depth controller threaded rod 205 is slideably movable in an axial direction and threadedly disposed within and secured to drill piston housing 219 by means of a vernier depth controller rod securing threads 217 which are made an integral part of drill piston housing 219 and vernier depth controller threaded rod 205.

Again referring to FIGS. 1–15, and considering the initial connection of compressed fluid flow conditions that exist as related to the drill piston housing 219 which provides for housing and axial movement of fluid driven rotatable motor 225, machine tool chuck and gear assembly 228 fixably coupled to drill piston housing 219 and operatively engaged to fluid driven rotatable motor 225 shaft, translates rotatable motion and axial movement forces to the machine cutting or drilling tool 233 to and from the direction of safety guide alignment shroud 230. Compressed fluid from supply fluid valve upper piston chamber 203 is supplied to and travels through to drill piston lower chamber upper flow passage 238, on through a drill piston lower chamber mid flow passage 235, through a drill piston lower chamber end flow passage 234 and into a drill piston lower chamber 258. A drill piston lower chamber upper flow passage plug 236 and a drill piston lower chamber end flow passage plug 266 both serve to prevent fluid flow from escaping to the atmosphere from drill piston lower chamber end flow passage 234. However, both drill piston lower chamber upper flow passage plug 236 and drill piston lower chamber end flow passage plug 266 can serve as bleed orifices if it is desirable to reduce the pressurized fluid flow in drill piston lower chamber 258.

A drill piston lower chamber flow passage o'rings 237 provide sealing to prevent pressurized fluid from escaping to the atmosphere where upper external housing 210 interfaces with intermediate external housing 214, and intermediate external housing 214 interfaces with lower external housing 218, in the area of both ends of drill piston lower chamber mid flow passage 235. Other sealing devices where external housing components interface include, but are not limited to a upper-mid external housing o'ring 288 and a mid-lower external housing o'ring 293.

Further, when initially connecting compressed air supply system 100, fluid flow is supplied to supply fluid valve upper piston chamber 203 through fluid flow pressure provided by fluid entering supply fluid inlet 201 and on through drill piston lower chamber upper flow passage 238, drill piston lower chamber mid flow passage 235, and drill piston lower chamber end flow passage 234, so as to pressurize drill piston lower chamber 258 at sufficient pressure and volume and, in adequate time to maintain an overriding differential pressure force to maintain drill piston housing 219 back toward intermediate external housing 214.

At this point, and prior to start-up, the pressure in drill piston upper chamber 251 is ambient because venting to the atmosphere is permitted through a drill piston upper chamber pressure orifice 254, on through a supply fluid valve piston connection flow passage 221, on through fluid driven rotatable motor 225, on through a drill piston air motor exhaust vents 223, into a air motor peripheral exhaust chamber 222 and out to the atmosphere through a lower external housing air motor exhaust vents 224. Differential pressure sealing between drill piston upper chamber 251 and drill piston lower chamber 258 is maintained by a drill piston differential pressure seals 295 and a drill piston lower chamber seal 264. Drill piston differential pressure seals 295 and drill piston lower chamber seal 264 are manufactured piston seals generally used in actuator devices that maintain pressure and flow conditions in a given area where pressurization of a fluid across a specified area provides for the existence of a pressure-area force in a desired direction. A drill piston o'ring 263 provides for surface interface with the internal bore of drill piston housing 219.

Drill piston housing 219 can be a singular structure, as shown, or be a telescoping piston design with one piston section within another, so as to permit greater movement distances of machine cutting or drilling tool 233 by means of a shorter length automated drilling apparatus 200.

By further reference to FIGS. 1–15, and considering the initial connection of compressed fluid flow conditions that are related to supply fluid valve piston 226 which provides for opening and closing off of the primary flow, when initially connecting compressed air supply system 100, fluid entering supply fluid inlet 201 is channeled, after entering supply fluid valve upper piston chamber 203, and is supplied to and travels through supply fluid valve piston inlet and flow passage 239 to a supply fluid valve upper-mid piston chamber orifice 252, a supply fluid valve lower-mid piston chamber orifice 253, and a supply fluid valve piston seat 261.

Further, when initially connecting compressed air supply system 100, fluid flow is supplied at sufficient pressure and volume and, in adequate time, to supply fluid valve upper piston chamber 203 through fluid flow pressure provided by fluid entering supply fluid inlet 201 and to a supply fluid valve upper-mid piston chamber 275 through fluid flow pressure provided by supply fluid valve upper-mid piston chamber orifice 252, so as to provide a positive differential pressure force across supply fluid valve piston 226. This positive differential pressure force across piston surface areas is generated by fluid pressure in supply fluid valve upper piston chamber 203 and supply fluid valve upper-mid piston chamber 275 which is greater than the positive differential pressure force generated by fluid pressure in a supply fluid valve lower-mid piston chamber 276 through fluid flow pressure provided by supply fluid valve lower-mid piston chamber orifice 253 and a supply fluid valve lower piston chamber 259 through fluid flow pressure provided by supply fluid valve piston inlet and flow passage 239.

Differential pressure sealing between supply fluid valve upper piston chamber 203 and supply fluid valve upper-mid piston chamber 275 is maintained by a supply fluid valve upper piston seal 289. Differential pressure between supply fluid valve upper-mid piston chamber 275 and supply fluid valve lower-mid piston chamber 276 is maintained by a supply fluid valve mid piston seal 291. Differential pressure between supply fluid valve lower-mid piston chamber 276 and supply fluid valve lower piston chamber 259 is maintained by a supply fluid valve lower piston seal 292. Supply fluid valve upper piston seal 289, supply fluid valve mid piston seal 291 and supply fluid valve lower piston seal 292 are manufactured piston seals generally used in actuator devices that maintain pressure and flow conditions in a given area where pressurization of a fluid across a specified area provides for the existence of a pressure-area force in a desired direction. It should be pointed out that all piston areas described herein this patent application can be adjusted to provide maximum performance and control flow conditions for a specific automated drilling apparatus 200 model.

Inasmuch as supply fluid valve piston 226 is axially and slidably disposed in both upper external housing 210 and intermediate external housing 214, the differential pressure force generated by fluid pressure across the respective surface areas causes supply fluid valve piston seat 261 to move forward, toward machine cutting or drilling tool 233, and blocks flow to supply fluid valve piston connection flow passage 221. The supply fluid valve piston seat 261, made of a pliable material, presses against supply fluid valve piston connection flow passage 221 mating seating geometry, thus maintaining the automated drilling apparatus 200 in its normal shut-off position. The pressure in the supply fluid valve lower-mid piston chamber 276 is adjustable by a supply fluid valve mid-lower piston chamber vent system 294 which is adjustable and programmable to finite pressure ranges. Supply fluid valve mid-lower piston chamber vent system 294 uniquely provides for start-up safety lock-out features.

With further reference to FIGS. 1–15, and considering the preferred embodiment second option of utilizing primary controller system which provides for machine tool depth control, as opposed to that previously described in utilizing drill piston vent pin 208, at the time of initial connection of compressed fluid flow conditions, in the normal shut-off position, the vernier depth controller 204 will continue to be utilized. The vernier depth controller 204 pressurization, in the vernier depth controller bore area 206 as also maintained by vernier depth controller threaded rod o'rings 212, are as described above. Again, as previously described, the vernier depth controller threaded rod 205 is slidably movable in an axial direction and threadedly disposed within and secured to drill piston housing 219 by means of vernier depth controller rod securing threads 217 which are made an integral part of drill piston housing 219 and vernier depth controller threaded rod 205.

As described above, for the preferred embodiment first option compressed air from supply fluid valve upper piston chamber 203, is supplied to and travels through to vernier depth controller flow passage 213 and into vernier depth controller bore area 206. Vernier depth controller 204 design also includes specific flow geometry to permit air flow around its peripheral area, even when bottomed out in vernier depth controller bore area 206, thus permitting air to flow through a primary controller piston flow inlet seat 240 and on into a primary controller piston bore area extension assembly 241.

A primary controller piston 244 is moved toward a primary controller piston flow pressurization passage 255 when initially connecting compressed air supply system 100 to automated drilling apparatus 200, because fluid flow is supplied at sufficient pressure and volume and, in adequate time, to supply primary controller piston bore area extension assembly 241 area with pressurized flow prior to permitting an overriding pressure force being generated in a primary controller piston constant pressure chamber 250. The lower pressure force being generated in primary controller piston constant pressure chamber 250 causes primary controller piston 244 to move toward the primary controller piston flow pressurization passage 255.

If the primary controller piston 244 were firmly seated on secondary flow area created by primary controller piston bore area extension assembly 241 seat area, which is smaller in area than the end area of primary controller piston 244, then there may be an overriding pressure force in the opposite direction. The pressure supplied to primary controller piston constant pressure chamber 250 is a function of pressurized flow from a primary controller piston constant flow control orifice 257 flow rate as compared to the larger size flow area of a primary controller piston constant flow vent orifice 256. Primary controller piston constant flow vent orifice 256 can be adjustable, if required, as can all orifices providing control functions for the automated drilling apparatus 200.

As an alternative, and to further assure that primary controller piston constant pressure chamber 250 pressure rise lags, the pressure rise in primary controller piston bore area extension assembly 241, primary controller piston constant pressure chamber 250 could be pressurized from supply fluid valve piston connection flow passage 221, which did not receive pressurized flow until the automated drilling apparatus 200 was commanded to commence its programmed operation. The alternative fluid flow passages are not shown.

Further, with the automated drilling apparatus 200 in its normal shut-off position, compressed air is permitted to enter a primary controller piston inlet flow vent area 242 which has a restricted flow geometry to permit the maintenance of sufficient pressure to maintain primary controller piston 244 in a position toward primary controller piston flow pressurization passage 255. At this point, compressed air is blocked from entering a flow passages to fluid supply upper-mid piston chamber 245 and a flow passages to drill upper piston chamber 246 because a primary controller piston pressure-flow seal o'rings 248 prohibit the compressed air flow from escaping from a primary controller piston flow diversion passages 243.

Additionally, with the automated drilling apparatus 200 in its normal shut-off position, a primary controller drill piston chamber vent 247 and a drill piston upper chamber vent passage 249 are sealed by primary controller piston pressure-flow seal o'rings 248.

Again referring to FIGS. 1–15, and considering the pecking controller, at the time of initial connection of compressed fluid flow conditions, which provides for programmed forward and backward cycles during the drilling or milling operation, when initially connecting compressed air supply system 100, fluid entering supply fluid inlet 201 is channeled, after entering supply fluid valve upper piston chamber 203 and is supplied to and travels through pecking controller flow meter valve supply inlet 280, which includes an intermediate plug to block flow, so as to cause the flow to enter a pecking controller flow meter valve 270. Pecking controller flow meter valve 270 is programmably adjustable and can be, in a preferred embodiment, a custom made needle valve, but may be a modified Clippard MNV3 model fine adjustment needle valve with custom dimensions and o'ring seals added to accommodate the positive pressure requirements of the present invention.

Programmed metered compressed air then travels through pecking controller flow meter valve 270 and into a pecking controller piston housing upper chamber 267 where it is blocked in the prestart-up mode by a pecking controller piston pressure-flow o'rings 283 attached to a pecking controller piston 282, a pecking controller metered flow passage plug 287 and partially or fully blocked as required by a pecking controller metered flow orifice 286. At prestart-up, compressed air is supplied to pecking controller piston housing upper chamber 267 at sufficient pressure and volume and, in adequate time to maintain an overriding differential pressure force to maintain pecking controller piston 282 forward toward lower external housing 218.

Further, at this point, and prior to start-up, the pressure in a pecking controller drill piston connector passage 269 and its interfacing drill piston upper chamber 251 is ambient because venting to the atmosphere is permitted through drill piston upper chamber pressure orifice 254, on through supply fluid valve piston connection flow passage 221, on through fluid driven rotatable motor 225, on through drill piston air motor exhaust vents 223 and out to the atmosphere through lower external housing air motor exhaust vents 224. Also, prior to start-up, a pecking controller drill piston chamber vent passage 284 and a pecking controller metered flow vent passage 285 are blocked off by pecking controller piston pressure-flow o'rings 283. Pecking controller drill piston chamber vent passage 284 would, in an operational mode, receive pressurized flow via a pecking controller bleed flow passage 268.

Again referring to FIGS. 1–15, when initially connecting compressed air supply system 100, the machine tool axial force regulation system provides for the amount of axial force applied to the machine cutting or drilling tool 233 only after the start-up of the automated drilling apparatus 200 has commenced. Initially, fluid entering supply fluid inlet 201 is channeled to supply fluid valve upper piston chamber 203, and travels through the supply fluid valve piston inlet and flow passage 239. However, until start-up, the pressurized fluid flow traveling through supply fluid valve piston inlet and flow passage 239 is blocked by supply fluid valve piston seat 261.

Therefore, when first connecting compressed air supply system 100 to automated drilling apparatus 200, there is no compressed fluid flow supplied to supply fluid valve piston connection flow passage 221, which would have provided pressurized flow to drill piston upper chamber 251 through drill piston upper chamber pressure orifice 254. The pressure in drill piston upper chamber 251 is at ambient conditions, prior to start-up, because venting to the atmosphere is permitted through drill piston upper chamber pressure orifice 254, on through supply fluid valve piston connection flow passage 221, on through fluid driven rotatable motor 225, on through drill piston air motor exhaust vents 223 and to the atmosphere through lower external housing air motor exhaust vents 224.

Further, after start-up, the machine tool axial force regulation system regulates the axial force on machine cutting or drilling tool 233 by controlling the pressure in drill piston upper chamber 251. When the pressure in drill piston upper chamber 251 is sufficiently high enough, a change in the pressure force level across drill piston housing 219 will cause the machine cutting or drilling tool 233 to move toward the workpiece to be machined. The machine tool chuck and gear assembly 228 fixably coupled to drill piston housing 219 and operatively engaged to fluid driven rotatable motor 225 shaft, holds machine cutting or drilling tool 233 and translates rotatable motion from fluid driven rotatable motor 225 and axial movement forces from drill piston housing 219 to the machine cutting or drilling tool 233 to and from the direction of safety guide alignment shroud 230.

The pressure in drill piston lower chamber 258 is constant at all times, therefore, when the machine tool axial force regulation system permits a sufficient increase in the pressure in drill piston upper chamber 251, the axial force balance changes accordingly. This is achieved by means of a force regulator metering flow valve 279 which adjusts the amount of flow that leaves a force regulator metering flow valve vent 281.

The amount of pressurized fluid flow that leaves force regulator metering flow valve vent 281 can also be optionally controlled by the vernier depth controller system where multi-pressure levels can be introduced into drill piston upper chamber 251 after start-up so as to cause drill piston housing 219 to move forward toward safety guide alignment shroud 230, first at a fast speed caused by greater force levels and, then, later at a lower speed caused by lowering the pressure in drill piston upper chamber 251 during the machining operation. These multi-force levels in the machine tool axial force regulation system would be programmed in with the vernier depth controller system through a multi-force regulator flow restrictors and passages system 265 shown in its general location.

The amount of flow leaving the force regulator metering flow valve vent 281, after entering a force regulator drill piston chamber flow passages 278, from drill piston upper chamber 251, will be compared to the constant flow that enters drill piston upper chamber pressure orifice 254, and optionally through the multi-force regulator flow restrictors and passages system 265, to determine the differential pressure force that exists to move drill piston housing 219 in one axial direction or the other.

A force regulator flow passage plug 277 keeps the compressed fluid flow from escaping to the atmosphere from the force regulator drill piston chamber flow passages 278. The force regulator flow passage plug 277 can also include an orifice geometry to assist force regulator metering flow valve vent 281 in maintaining various flow vent conditions. Force regulator metering flow valve vent 281 is programmably adjustable and can be, in a preferred embodiment, a custom made needle valve, but may be a modified Clippard MNV3 model fine adjustment needle valve with custom dimensions and o'ring seals added to accommodate the positive pressure requirements of the present invention.

Figure 5C:
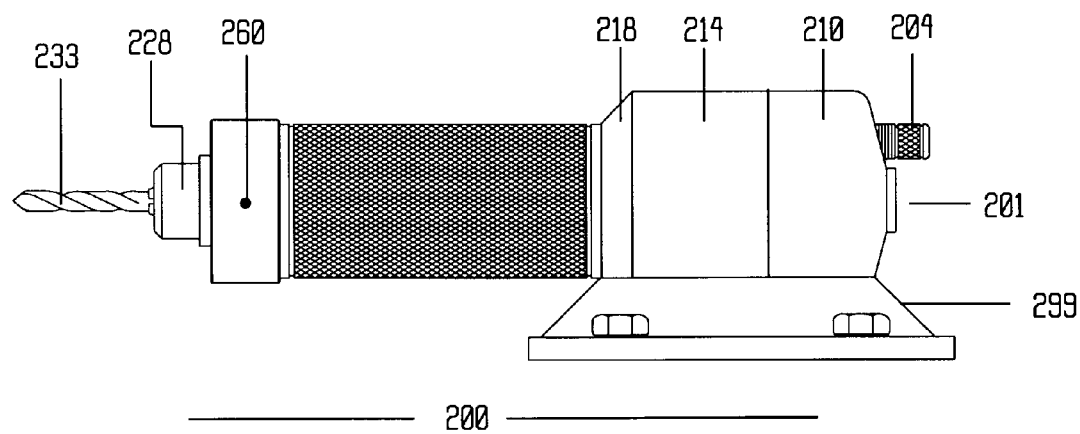
FIG. 5C is an outline drawing side view of another preferred embodiment illustrating a machine mounted option of the automated drilling apparatus of the present invention.
Figure 6C:
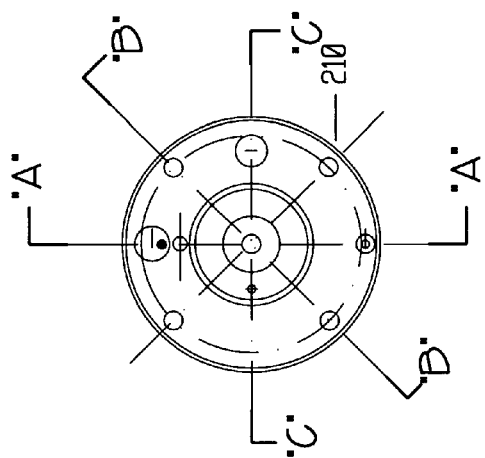
FIG. 6C is a right distal end view of the upper external housing of the automated drilling apparatus of the present invention.
Figure 6A:
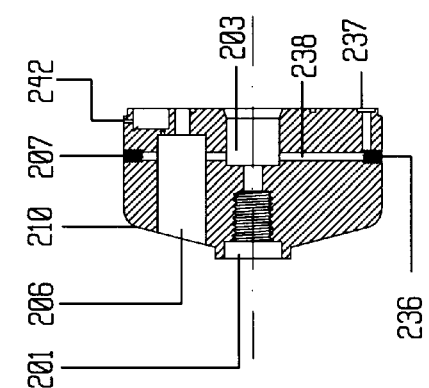
FIG. 6A is a side view taken along the lines of A—A of FIG. 6B of a preferred embodiment of the upper external housing of the automated drilling apparatus of the present invention.
Figure 6B:
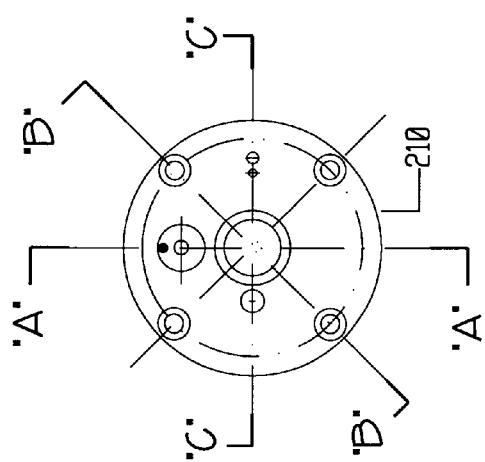
FIG. 6B is a left proximal end view of the upper external housing of the automated drilling apparatus of the present invention.
Figure 6E:
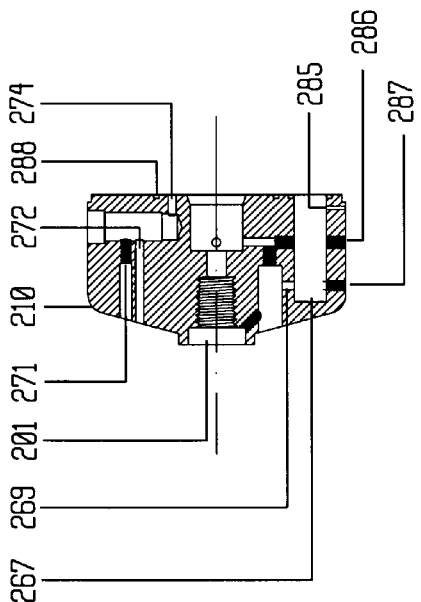
FIG. 6E is a side view taken along the lines of C—C of FIG. 6B of the upper external housing of the automated drilling apparatus of the present invention.
Figure 6D:
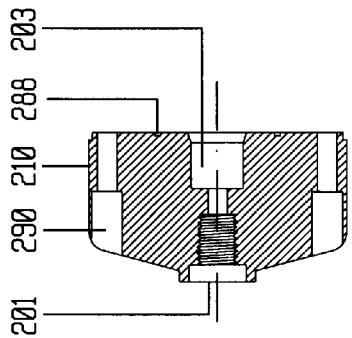
FIG. 6D is a side view taken along the lines of B—B of FIG. 6B of another portion of the upper external housing of the automated drilling apparatus of the present invention.
Figure 8C:
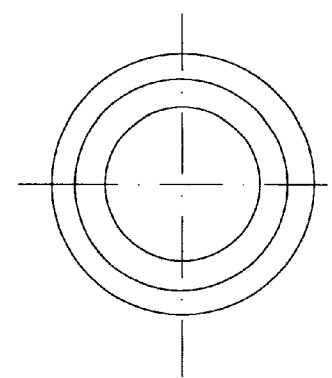
FIG. 8C is a right distal end view of the lower external housing of the automated drilling apparatus of the present invention.
Figure 8D:
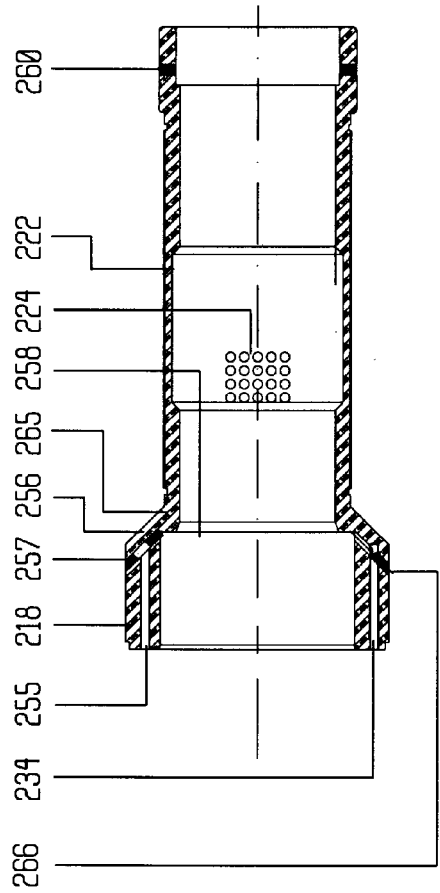
FIG. 8D is a side view taken along the lines of B—B of FIG. 8B of another portion of the lower external housing of the automated drilling apparatus of the present invention.
Figure 8A:
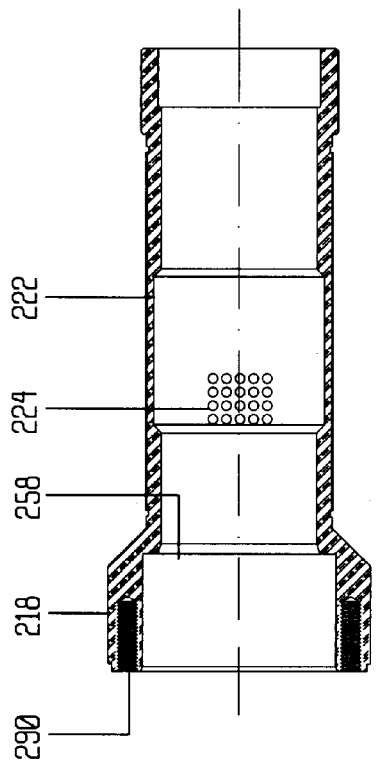
FIG. 8A is a side view taken along the lines of A—A of FIG. 8B of a preferred embodiment of the lower external housing of the automated drilling apparatus of the present invention.
Figure 8B:
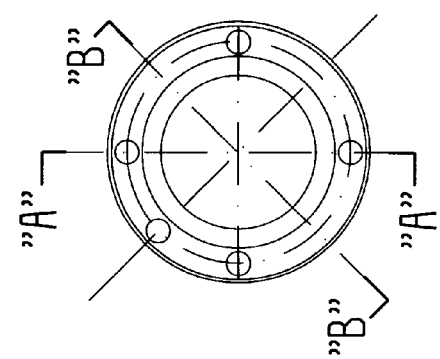
FIG. 8B is a left proximal end view of a preferred embodiment of the lower external housing of the automated drilling apparatus of the present invention.
Figure 12A:
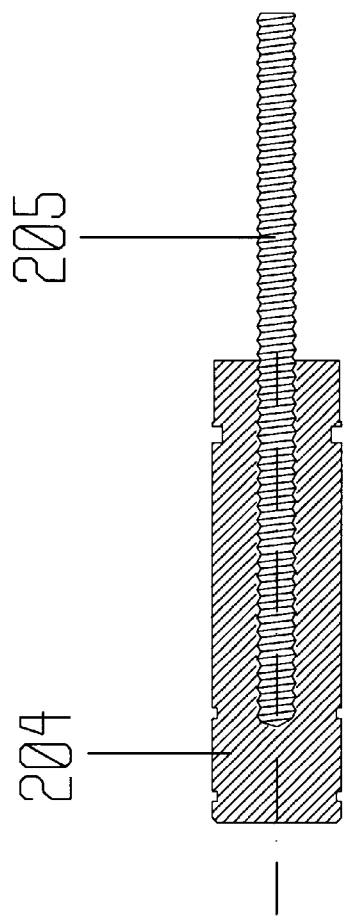
FIG. 12A is a side view taken along the lines of A—A of FIG. 12B of a preferred embodiment of the vernier depth controller of the automated drilling apparatus of the present invention.
Figure 12B:
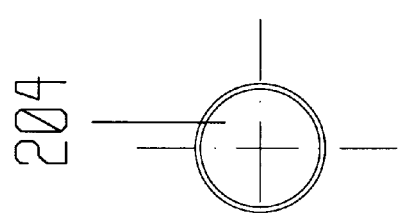
FIG. 12B is a left proximal end view of the vernier depth controller of the automated drilling apparatus of the present invention.
Figure 12C:
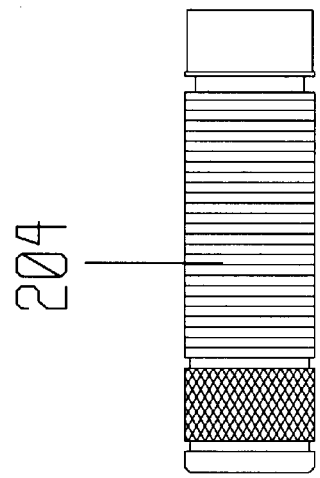
FIG. 12C is an external side view illustration of the vernier depth controller of the automated drilling apparatus of the present invention.
Figure 13A:
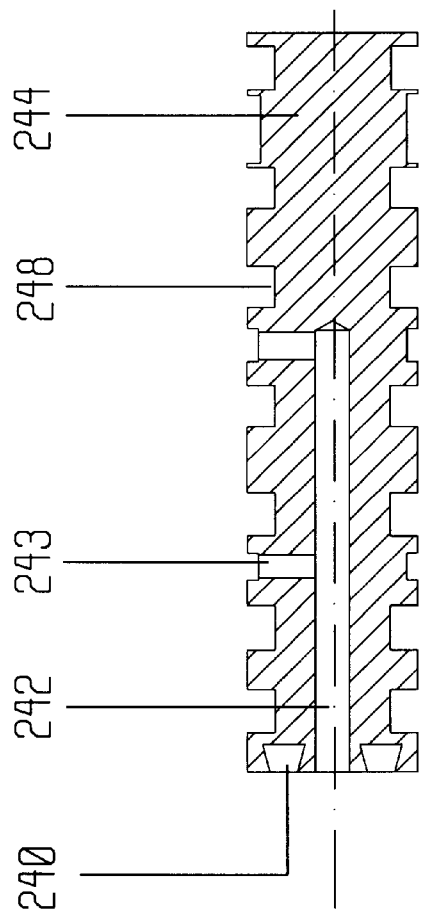
FIG. 13A is a side view taken along the lines of A—A of FIG. 13B of a preferred embodiment of the primary controller piston of the automated drilling apparatus of the present invention.
Figure 13B:
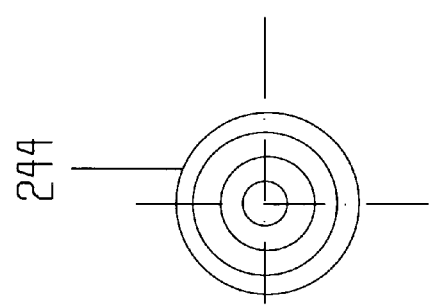
FIG. 13B is a left proximal end view of the primary controller piston of the automated drilling apparatus of the present invention.
Figure 13C:
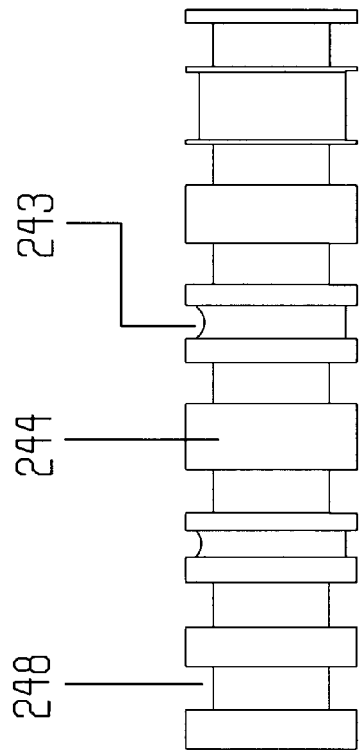
FIG. 13C is an external side view illustration of the primary controller piston of the automated drilling apparatus of the present invention.
Figure 14A:
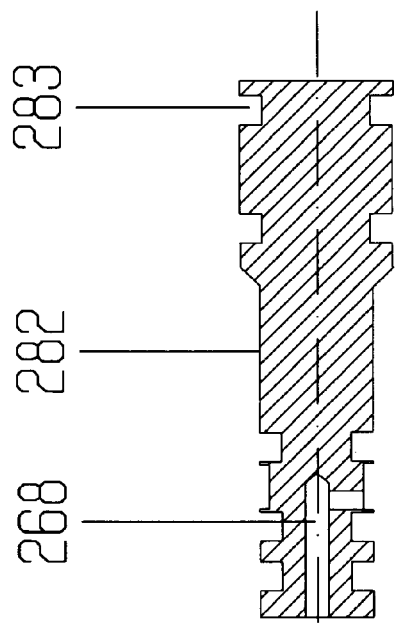
FIG. 14A is a side view taken along the lines of A—A of FIG. 14B of a preferred embodiment of the pecking controller piston of the automated drilling apparatus of the present invention.
Figure 14B:
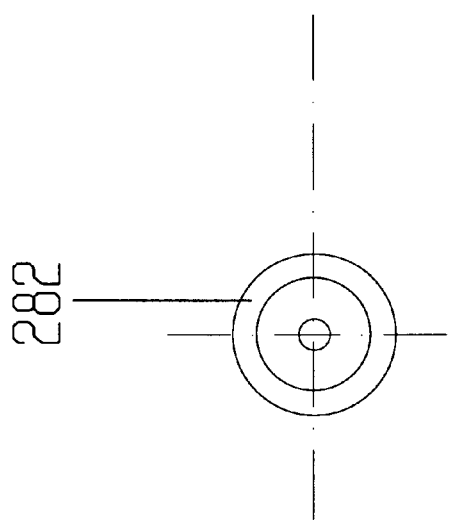
FIG. 14B is a left proximal end view of the pecking controller piston of the automated drilling apparatus of the present invention.
Figure 14C:
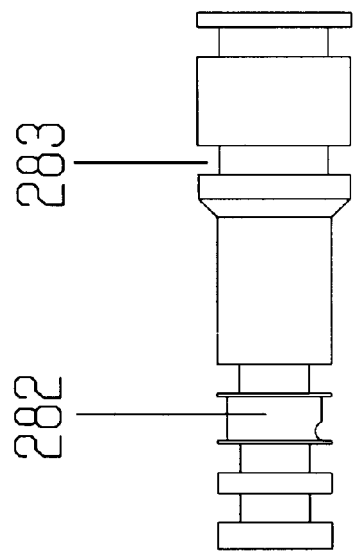
FIG. 14C is an external side view illustration of the pecking controller piston of the automated drilling apparatus of the present invention.
Figure 15:
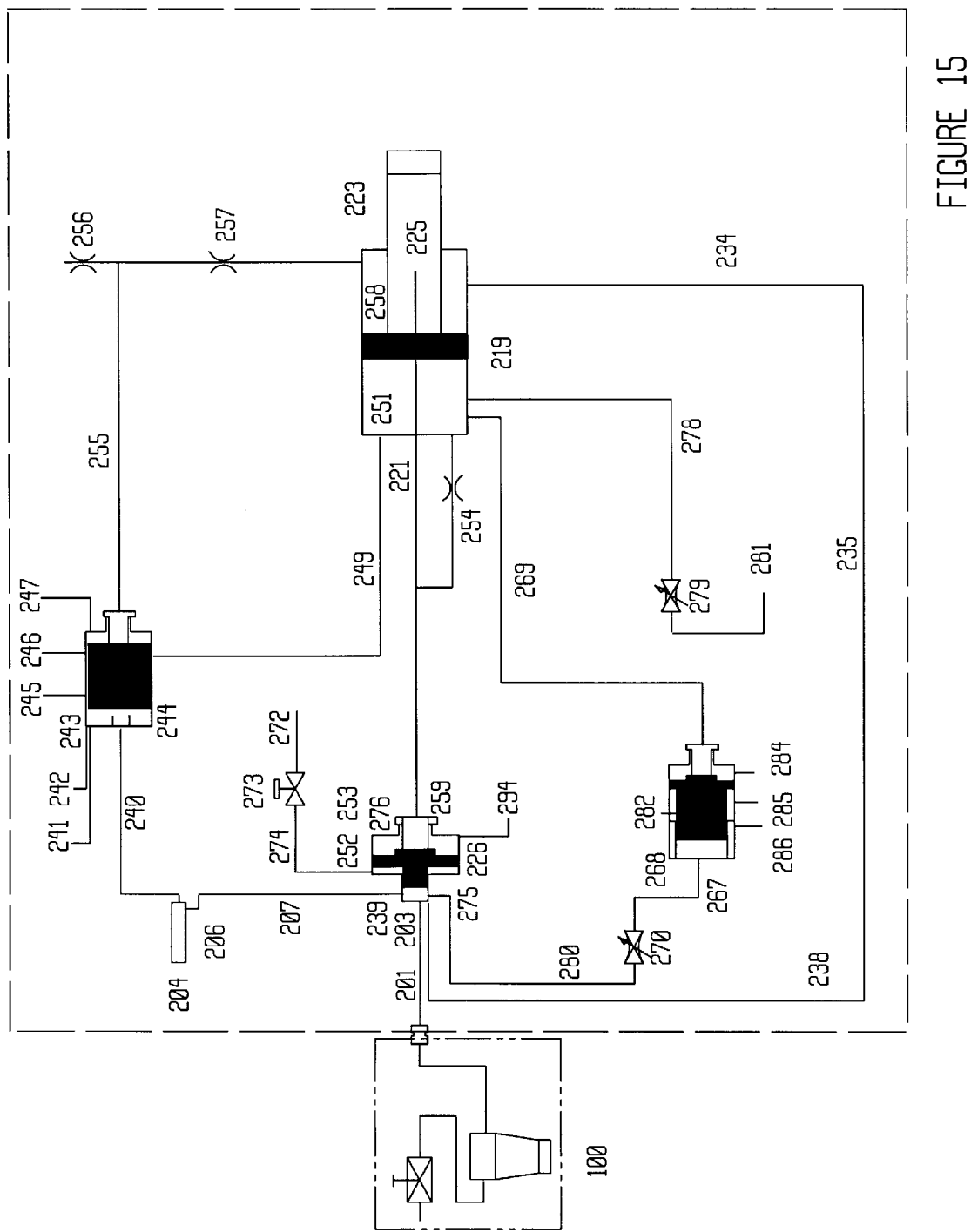
FIG. 15 is a schematic illustrating some components, only part, of the control system of a preferred embodiment of the automated drilling apparatus of the present invention.

Referring to FIGS. 1–15, and considering the start-up operation, after initial connection of compressed fluid flow conditions by the operator, and after all programmed adjustments have been made, the automated drilling machine 200 has a built-in safety anti-start feature that can be enabled or disabled by adjustment of the supply fluid valve mid-lower piston chamber vent system 294 which consists of flow passages, built in orifices and a pressure valve. If the safety anti-start feature of the supply fluid valve mid-lower piston chamber vent system 294 is enabled, the operator must first depress its pressure valve and then depress start valve 273 which is held in place by a start valve locking fastener 271. In the case of a machine mounted adapter 299 configuration, as illustrated in FIG. 5C, start valve 273 may be replaced with an external controller input device which serves the same function as the start valve 273 in venting supply fluid valve upper-mid piston chamber 275. Start valve 273 can be custom made or a Clippard MAV2C model two way poppet cartridge valve with o'ring sealing capability or be a custom designed two way valve to meet specific design venting conditions of venting supply fluid valve upper-mid piston chamber 275.

Once the operator starts the automated drilling apparatus 200, the start valve 273 must remain depressed until automatic shutoff or an emergency shut-down is required, but the pressure valve made integral to supply fluid valve mid-lower piston chamber vent system 294, located on the outside of intermediate external housing 214, can be adjusted to be released after start-up. Provisions, however, can be made to permit a release of start valve 273 by the operation, while maintaining continued operator, but this action will advert certain inherent safety features of automatic shut-down once the start valve 273 is released.

Further when start valve 273 is depressed, pressurized flow in supply fluid valve upper-mid piston chamber 275 is vented through a start valve upper-mid piston chamber vent flow passage 274 and on out through a start valve vent passage 272. The venting of pressurized fluid in supply fluid valve upper-mid piston chamber 275 lowers the differential pressure to near zero, while the differential pressure forces in supply fluid valve upper piston chamber 203, supply fluid valve lower-mid piston chamber 276 and supply fluid valve lower piston chamber 259 remain the same as when compressed air was initially connected to automated drilling apparatus 200.

However, the venting of pressurized fluid in supply fluid valve upper-mid piston chamber 275 may not change the positive differential pressure force, previously described to initially exist across supply fluid valve piston 226 to the opposite direction so as to be slidable and axially cause supply fluid valve piston 226 to move back toward supply fluid valve upper piston chamber 203, unless the operator depresses the pressure valve made integral to supply fluid valve mid-lower piston chamber vent system 294 for the time required to build up pressure in supply fluid valve lower-mid piston chamber 276 causing an overriding change in differential pressure force which moves supply fluid valve piston 226, toward supply fluid valve upper piston chamber 203, thus permitting compressed fluid to flow around supply fluid valve piston seat 261 area and out supply fluid valve piston connection flow passage 221. The movement of supply fluid valve piston 226 back toward supply fluid valve upper piston chamber 203 creates an even greater differential pressure force when supply fluid valve piston seat 261 area is fully exposed to maximum pressure existing in supply fluid valve lower piston chamber 259, when fluid flows through a supply fluid valve piston seat diverter holes 220, after which time the pressure valve made integral to supply fluid valve mid-lower piston chamber vent system 294 can be released.

Further, after supply fluid valve piston 226 backs toward supply fluid valve upper piston chamber 203 and flow entered supply fluid valve piston connection flow passage 221, compressed fluid could now travel through drill piston upper chamber pressure orifice 254 to pressurize drill piston upper chamber 251, so as to create a differential pressure force against drill piston housing 219, great enough to override the constant differential pressure force that remains near constant caused by the pressurized flow in the drill piston lower chamber 258, thus causing the drill piston housing 219 to move forward toward safety guide alignment shroud 230 while machine tool chuck and gear assembly 228 fixably coupled to drill piston housing 219 and operatively engaged to fluid driven rotatable motor 225 shaft, holds machine cutting or drilling tool 233 and translates rotatable motion from fluid driven rotatable motor 225 and axial movement forces from drill piston housing 219 to the machine cutting or drilling tool 233 to and from the direction of safety guide alignment shroud 230. Differential pressure is maintained in drill piston upper chamber 251 by a drill piston primary flow seals 297 as drill piston housing 219 moves forward and back in a slidable axial motion while drill piston primary flow seals 297 remain stationary, attached to intermediate external housing 214.

Forward movement of drill piston housing 219 can be interrupted by releasing the start valve 273, or when vernier depth controller 204 seats on primary controller piston flow inlet seat 240 when primary controller option is used, or when vernier depth controller 204 moves drill piston vent pin 208 forward to its vent position, or during intermittent interruption of the forward movement by the pecking controller. These conditions will be further described in the operation's section.

Compressed fluid flow traveling through supply fluid valve piston connection flow passage 221 also travels to fluid driven rotatable motor 225 on through drill piston air motor exhaust vents 223 and out to the atmosphere through lower external housing air motor exhaust vents 224.

Again referring to FIGS. 1–15, and looking at some of the other components that are integrally coupled to automated drilling apparatus 200, a upper-mid-lower external housing bolts 290 and a lower external housing bolt threads 296 secure upper external housing 210 and intermediate external housing 214 to lower external housing 218. A drill piston air motor retainer fasteners 262 secure drill piston housing air motor retainer 227 to drill piston housing 219 after fluid driven rotatable motor 225 and machine tool chuck and gear assembly 228 are installed in the drill piston housing 219 internal geometry designed to match a specific fluid driven rotatable motor 225 and machine tool chuck and gear assembly 228 specifications. In a preferred embodiment, components from an Ingersoll-Rand Series 6 production drill, 0.51 horsepower, 2150 RPM, #6LL1 could be utilized, however other manufacturers' air drill components of varying sizes and shapes could be fitted into automated drilling apparatus 200 drill piston housing 219 providing internal machining that matched.

Further, a safety guide shroud locking fasteners 260 secure the safety guide alignment shroud 230 to lower external housing 218. Safety guide shroud locking fasteners 260 can be set screw type fasteners or fasteners similar to thumb nuts or other type fasteners. A safety guide alignment shroud attachment area 231 permits the attachment of an alignment plate or fixture, so as to permit hand-held drilling operations at a particular angle of attack for the machine or drilling tool 233. A safety guide alignment shroud drill bit passage 232 is designed for clearance around a range of machine or drilling tool 233 sizes. A safety guide alignment shroud chip removal holes 229 permit material chips to remove themselves during the operation of the automated drilling apparatus 200.

Fluid driven rotatable motor 225 and machine tool chuck and gear assembly 228 can be off-the-shelf components, as previously described, or be specially designed to meet specific machine operations. For example, the fluid driven rotatable motor 225 can be a vane type or turbine design. Further, machine tool chuck and gear assembly 228 may be assembled from special thrust bearings, special gearing and chuck components. The requirement for specific uses of automated drilling apparatus 200 will determine whether or not off-the-shelf components will meet machining, grinding or drilling operations.

Safety guide alignment shroud 230 is shown with safety guide alignment shroud chip removal holes 229, but it is also envisioned that safety guide alignment shroud 230 can be sealed and even purged with air or an inert gas to provide safe working operation in an explosive environment where concern for heat or sparks exists, such as a health hazard to the operator exist.

Safety guide alignment shroud 230 can also be equipped with an attachment that provides for an alignment base and attaches to safety guide alignment shroud attachment area 231. Further, safety guide alignment shroud 230 can also be equipped with an attachment that will hold the automated drilling apparatus 200 to the workpiece being drilled or machined. The holding apparatus, which attaches to safety guide alignment shroud attachment area 231 or another area of automated drilling apparatus 200, can be a strap, a chain clamp, a magnetic clamp, a mechanical clamp, a vacuum clamp or other type clamping apparatus.

It should be pointed out that all piston areas described herein this provisional application can be adjusted to provide maximum performance and control flow conditions for a specific automated drilling apparatus 200 model.

It is also noted that various control systems presented herein can be made part of or option to the automated drilling apparatus 200 model, so as to offer less expensive models where complete control system capability is not required.

Operation

Generally described, the automated drilling apparatus 200 offers the following programmable features: (1) Anti-start safety features can be enabled or disabled; (2) start-up of the machine can be operator controlled, as is with the case of the axial grip hand-held model shown in FIG. 5A or remotely controlled by a converted pneumatic signal by either operator intervention or a signal from a pneumatic, electrical, hydraulic or mechanical input; (3) the axial force level which is applied on the rotating machine cutting or drilling tool 233 can be programmed from light to heavy with multi-level force programming capability tied into the vernier depth controller system; (4) the pecking cycle which inserts and removes the rotating machine cutting or drilling tool 233, can be programmed to short or long cyclic rates to meet particular cutting or drilling needs; and (5) the depth to which the rotating machine cutting or drilling tool 233 goes before final retraction is set by a vernier depth controller 204. Additionally, it is envisioned that variable speed fluid driven rotatable motors 225 will be later used as an additional programmable feature.

The automated drilling apparatus 200 is automatically reset to a start position when the compressed air supply system 100 is connected. Further generally described, the automated drilling apparatus 200 performs the following machine cutting or drilling functions after start-up: (1) the fluid driven rotatable motor 225 is energized; (2) the drill piston housing 219 moves the rotating machine cutting or drilling tool 233 forward toward its programmable depth; (3) if enabled, the pecking controller causes the drill piston housing 219 to retract and then again move the machine cutting or drilling tool 233 forward, to greater depths, so as to provide for cleaner cutting and removal of chips as the rotating machine cutting or drilling tool 233 moves forward toward its programmable depth; (4) the programmable force level controller system prevents excessive force being applied to rotating machine cutting or drilling tool 233 as it moves forward toward its programmable depth and can be designed to give multi-force levels to meet specific needs such as fast (high force level) as the rotating machine cutting or drilling tool 233 approaches to the workpiece, then lower forces when drilling or machining; (5) the vernier depth gauge stops the forward motion of drill piston housing 219 once the programmable depth is reached and causes all control systems to be overridden until the drill piston housing 219 is fully retracted to its start position, when the primary controller is utilized; and (6) once the drill piston housing 219 is fully retracted, a signal can be provided to shut down the automated drilling apparatus 200.

Operation of automated drilling apparatus 200 is governed by its many programmable control system features and operator intervention considerations. For the purpose of the following discussion, the upper proximal end of automated drilling apparatus 200 is identified as upper external housing 210. The lower distal end is identified by the safety guide alignment shroud attachment area 231.

The automated drilling apparatus 200 is robotic in operation and has the ability to send and receive pressure and vent signals from within and from other electrical, hydraulic, pneumatic and mechanical systems, so as to provide various pressure-flow outputs through special porting (not shown) that is connected to start valve 273 and various flow passages as described herein. Automated drilling apparatus 200 is a pressure flow impedance matched device that can be manually controlled when hand-held by an operator or automatically or manually controlled when attached to industrial machinery when made an integral part of an air tool or other industrial equipment so as to feed back positioning information to automated drilling apparatus 200. Input devices, such as electrical interface devices, hydraulic interface devices, mechanical interface devices and additional pneumatic inputs, could also be connected to make the automatic operation compatible with an industrial robotic application.

For the purpose of discussion of the operation of the automated drilling apparatus 200, we will consider the hand-held operation with either the axial grip hand-held model or the pistol grip hand-held model. However, it is emphasized that the automated drilling apparatus 200 could become an integral part of a machine operation and that setup could be controlled by external inputs when mounted on an industrial machine. In the machine mounted operation, output devices such as air cylinders, air motors, actuators, electrical interface devices, hydraulic interface devices and mechanical interface devices would be set up to receive signals from automated drilling apparatus 200.

Prior to commencing the hand-held portable use of the automated drilling apparatus 200, the operator now has to make a number of setup decisions depending on the industrial application that is being controlled by automated drilling apparatus 200. The operator has the choice of using the apparatus to control various functions including, but not limited to: (1) programming the vernier depth controller 204; (2) programming the pecking controller time cycle rate; (3) enable or disable the anti-start system; and (4) program in the desired axial force level, single or multi-level force.

Once specific input and output devices are connected, the system is then physically prepared to make the connection to compressed air supply system 100. The operator connects compressed air supply system 100 to an air compressor or industry plant air line. In initiating the setup operation, the operator first determines, by reference to a regulator pressure gauge (not shown), that desired plant air pressure and flow capability are insured. Preferably, filtered and lubricated compressed air supply system 100 is connected to power source quick disconnect (not shown). A quick disconnect permits the ease of connecting and disconnecting automated drilling apparatus 200 to any standard plant air or compressed air supply system 100.

In a preferred embodiment setup, a three way ball valve is first connected to an air filter-lubricator-dryer assembly which are connected to a mating quick disconnect part (not shown) threaded into supply fluid inlet threads 202. Supply fluid inlet 201 with supply fluid inlet threads 202 located in the upper external housing 210, is located at the proximal end in a preferred embodiment, but can be located approximately one third of the distance from the proximal end considering the integrated safety features of a pistol grip handle with start valve 298.

Let's first look at the pre-start position, prior to the operator depressing supply fluid valve mid-lower piston chamber vent system 294 pressure valve, and start valve 273. When compressed air supply system 100 is initially connected to the automated drilling apparatus 200, the air is distributed from supply fluid inlet 201 in a manner to assure that automated drilling apparatus 200 returns to its normal shut-off start position. Filtered plant air from a flexible connection hose (not shown) enters automated drilling apparatus 200 at a preferred air pressure of 80 to 120 PSIG via supply fluid inlet 201 and is channeled, after entering a supply fluid valve upper piston chamber 203, to supply fluid valve piston inlet and flow passage 239, drill piston lower chamber upper flow passage 238, vernier depth controller flow passage with plug 207, and pecking controller flow meter valve supply inlet 280. The flow geometry of the supply fluid valve upper piston chamber 203 permits the required compressed air supply system 100 air flow to be maintained at operational nominal inlet pressures of approximately 80 to 120 pounds per square inch, with flow volume requirements, depending on the size of the automated drilling apparatus 200 and/or its output devices, generally within the approximate fluid flow rate range of 3–25 cubic feet per minute.

Further continuing on in the pre-start mode and considering initial connection of compressed fluid with the preferred embodiment first option of utilizing drill piston vent pin 208, compressed air from supply fluid valve upper piston chamber 203 is supplied to and travels through to vernier depth controller flow passage 213 and into vernier depth controller bore area 206. Since drill piston vent pin 208 is slidably movable in an axial direction, drill piston vent pin retainer o'ring 209 keeps drill piston vent pin 208 from moving too far toward drill piston housing 219. Drill piston vent pin o'ring 211 prevents pressurized fluid flow from entering a drill piston vent pin vent interconnecting flow passage 215 and escaping to the atmosphere. Drill piston vent pin sealing o'ring 216 maintains pressurization in drill piston upper chamber 251. Vernier depth controller flow passage with plug 207 also maintains pressure in the vernier depth controller bore area 206.

Vernier depth controller 204, preset to a specific programmable depth, is used in conjunction with drill piston vent pin 208 to limit the axial movement of drill piston to a predetermined programmed distance, when traveling on vernier depth controller threaded rod 205, as required for a specific drilling or milling operation. Pressurization in the vernier depth controller bore area 206 is also maintained by vernier depth controller threaded rod o'rings 212. Vernier depth controller threaded rod 205 is slidably movable in an axial direction as it is secured to drill piston housing 219 by means of vernier depth controller rod securing threads 217, which are made an integral part of drill piston housing 219 and vernier depth controller threaded rod 205.

Further, consider the initial connection of compressed fluid flow conditions that exist as related to the drill piston housing 219. Drill piston housing 219 provides for housing and axial movement of fluid driven rotatable motor 225, machine tool chuck and gear assembly 228 and machine cutting or drilling tool 233 to and from the direction of the safety guide alignment shroud 230. The machine tool chuck and gear assembly 228 fixably coupled to drill piston housing 219 and operatively engaged to fluid driven rotatable motor 225 shaft, holds machine cutting or drilling tool 233 and translates rotatable motion from fluid driven rotatable motor 225 and axial movement forces from drill piston housing 219 to the machine cutting or drilling tool 233 to and from the direction of safety guide alignment shroud 230.

Compressed fluid from supply fluid valve upper piston chamber 203 is supplied to and travels through to the drill piston lower chamber upper flow passage 238, on through drill piston lower chamber mid flow passage 235, through drill piston lower chamber end flow passage 234 and into drill piston lower chamber 258. The drill piston lower chamber upper flow passage plug 236 and drill piston lower chamber end flow passage plug 266 both serve to prevent fluid flow from escaping to the atmosphere from drill piston lower chamber end flow passage 234. However, both drill piston lower chamber upper flow passage plug 236 and drill piston lower chamber end flow passage plug 266 can serve as bleed orifices if it is desirable to reduce the pressurized fluid flow in drill piston lower chamber 258.

Drill piston lower chamber flow passage o'rings 237 provide sealing to prevent pressurized fluid from escaping to the atmosphere where upper external housing 210 interfaces with intermediate external housing 214, and intermediate external housing 214 interfaces with lower external housing 218, in the area of both ends of drill piston lower chamber mid flow passage 235. Other sealing devices where external housing components interface include, but are not limited to the upper-mid external housing o'ring 288 and mid-lower external housing o'ring 293.

Further, compressed fluid flow is supplied to supply fluid valve upper piston chamber 203 after entering supply fluid inlet 201 and on through drill piston lower chamber upper flow passage 238, drill piston lower chamber mid flow passage 235, and drill piston lower chamber end flow passage 234, so as to pressurize drill piston lower chamber 258 at sufficient pressure and volume and, in adequate time to maintain an overriding differential pressure force to maintain drill piston housing 219 back toward intermediate external housing 214.

At this point, and prior to start-up, the pressure in drill piston upper chamber 251 is at ambient atmospheric pressure because venting to the atmosphere is permitted through drill piston upper chamber pressure orifice 254, on through supply fluid valve piston connection flow passage 221, on through fluid driven rotatable motor 225, on through drill piston air motor exhaust vents 223, into air motor peripheral exhaust chamber 222 and out to the atmosphere through lower external housing air motor exhaust vents 224. Differential pressure sealing between drill piston upper chamber 251 and drill piston lower chamber 258 is maintained by the drill piston differential pressure seals 295 and drill piston lower chamber seal 264. The drill piston o'ring 263 provides for surface interface with the internal bore of drill piston housing 219.

Again considering pre-start conditions and at the initial connection of compressed fluid flow to automated drilling apparatus 200, it is pointed out that supply fluid valve piston 226 provides for opening and closing off of the primary flow. After connection of compressed air supply system 100, fluid entering supply fluid inlet 201 is channeled, after entering supply fluid valve upper piston chamber 203, and travels through supply fluid valve piston inlet and flow passage 239 to supply fluid valve upper-mid piston chamber orifice 252, supply fluid valve lower-mid piston chamber orifice 253, and supply fluid valve piston seat 261.

Further, compressed air supply system 100 fluid flow is supplied at sufficient pressure and volume and, in adequate time, to supply fluid valve upper piston chamber 203 through fluid flow pressure provided by fluid entering supply fluid inlet 201 and to supply fluid valve upper-mid piston chamber 275 through fluid flow pressure provided by supply fluid valve upper-mid piston chamber orifice 252, so as to provide a positive differential pressure force across supply fluid valve piston 226. This positive differential pressure force across piston surface areas is generated by fluid pressure in supply fluid valve upper piston chamber 203 and supply fluid valve upper-mid piston chamber 275 which is greater than the positive differential pressure force generated by fluid pressure in the supply fluid valve lower-mid piston chamber 276 through fluid flow pressure provided by supply fluid valve lower-mid piston chamber orifice 253 and supply fluid valve lower piston chamber 259 through fluid flow pressure provided by supply fluid valve piston inlet and flow passage 239.

Differential pressure sealing between supply fluid valve upper piston chamber 203 and supply fluid valve upper-mid piston chamber 275 is maintained by supply fluid valve upper piston seal 289. Differential pressure between supply fluid valve upper-mid piston chamber 275 and supply fluid valve lower-mid piston chamber 276 is maintained by the supply fluid valve mid piston seal 291. Differential pressure between supply fluid valve lower-mid piston chamber 276 and supply fluid valve lower piston chamber 259 is maintained by supply fluid valve lower piston seal 292.

Inasmuch as supply fluid valve piston 226 is axially and slidably disposed in both upper external housing 210 and intermediate external housing 214, the differential pressure force generated by fluid pressure across the respective surface areas causes supply fluid valve piston seat 261 to move forward, toward machine cutting or drilling tool 233, and blocks flow to supply fluid valve piston connection flow passage 221. The supply fluid valve piston seat 261 presses against supply fluid valve piston connection flow passage 221 mating seating geometry, thus maintaining the automated drilling apparatus 200 in its normal shut-off position. The pressure in the supply fluid valve lower-mid piston chamber 276 is adjustable by supply fluid valve mid-lower piston chamber vent system 294 which is adjustable and programmable to finite pressure ranges. Supply fluid valve mid-lower piston chamber vent system 294 uniquely provides for start-up safety lock-out features.

Again at pre-start normal shut-off position conditions and considering the preferred embodiment second option of utilizing primary controller system which provides for machine tool depth control, as opposed to that previously described in utilizing drill piston vent pin 208, the vernier depth controller 204 will continue to be utilized. The vernier depth controller 204 pressurization in the vernier depth controller bore area 206, as also maintained by vernier depth controller threaded rod o'rings 212, are as described above. Again, as previously described, the vernier depth controller threaded rod 205 is slidably movable in an axial direction and threadedly disposed within and secured to drill piston housing 219 by means of vernier depth controller rod securing threads 217 which are made an integral part of drill piston housing 219 and vernier depth controller threaded rod 205.

Further, compressed air from supply fluid valve upper piston chamber 203, is to supplied to and travels through to vernier depth controller flow passage 213 and into vernier depth controller bore area 206. Vernier depth controller 204 design also includes specific flow geometry to permit air flow around its peripheral area, even when bottomed out in vernier depth controller bore area 206, thus permitting air to flow through a primary controller piston flow inlet seat 240 and on into primary controller piston bore area extension assembly 241.

A primary controller piston 244 is moved toward primary controller piston flow pressurization passage 255 when initially connecting compressed air supply system 100 to automated drilling apparatus 200, because fluid flow is supplied at sufficient pressure and volume and, in adequate time, to supply primary controller piston bore area extension assembly 241 area with pressurized flow prior to permitting an overriding pressure force being generated in primary controller piston constant pressure chamber 250. The lower pressure force being generated in primary controller piston constant pressure chamber 250 causes primary controller piston 244 to move toward primary controller piston flow pressurization passage 255.

If the primary controller piston 244 were firmly seated on secondary flow area created by primary controller piston bore area extension assembly 241 seat area, which is smaller in area than the end area of primary controller piston 244, then there may be an overriding pressure force in the opposite direction. The pressure supplied to primary controller piston constant pressure chamber 250 is a function of pressurized flow from a primary controller piston constant flow control orifice 257 flow rate as compared to the larger size flow area of a primary controller piston constant flow vent orifice 256. Primary controller piston constant flow vent orifice 256 can be adjustable, if required, as can all orifices providing control functions for the automated drilling apparatus 200.

As an alternative, and to further assure that primary controller piston constant pressure chamber 250 pressure rise lags, the pressure rise in primary controller piston bore area extension assembly 241, primary controller piston constant pressure chamber 250 could be pressurized from supply fluid valve piston connection flow passage 221, which did not receive pressurized flow until the automated drilling apparatus 200 was commanded to commence its programmed operation. The alternative fluid flow passages are not shown.

Further, in the normal shut-off mode, compressed air is permitted to enter a primary controller piston inlet flow vent area 242 which has a restricted flow geometry to permit the maintenance of sufficient pressure to maintain primary controller piston 244 in a position toward primary controller piston flow pressurization passage 255. At this point, compressed air is blocked from entering flow passages to fluid supply upper-mid piston chamber 245 and flow passages to drill upper piston chamber 246 because primary controller piston pressure flow seal o'rings 248 prohibit the compressed air flow from escaping from primary controller piston flow diversion passages 243. Additionally, primary controller drill piston chamber vent 247 and drill piston upper chamber vent passage 249 are sealed by primary controller piston pressure flow seal o'rings 248.

Again, considering pre-start normal shut-off mode conditions, and considering the pecking controller, which provides for programmed cycles during the drilling or milling operation, fluid entering supply fluid inlet 201 is channeled, after entering supply fluid valve upper piston chamber 203 and travels through pecking controller flow meter valve supply inlet 280, which includes an intermediate plug to block flow, so as to cause the flow to enter a pecking controller flow meter valve 270. Programmed metered compressed air then travels through pecking controller flow meter valve 270 and into pecking controller piston housing upper chamber 267 where it is blocked in the pre-startup mode by pecking controller piston pressure-flow o'rings 283 attached to pecking controller piston 282, pecking controller metered flow passage plug 287 and partially or fully blocked as required by pecking controller metered flow orifice 286. Upon initial connection, compressed fluid is supplied to pecking controller piston housing upper chamber 267 at sufficient pressure and volume and, in adequate time to maintain an overriding differential pressure force to maintain pecking controller piston 282 forward toward lower external housing 218.

Further, at this point, and prior to start-up, the pressure in pecking controller drill piston connector passage 269 and its interfacing drill piston upper chamber 251 is ambient because venting to the atmosphere is permitted through drill piston upper chamber pressure orifice 254, on through supply fluid valve piston connection flow passage 221, on through fluid driven rotatable motor 225, on through drill piston air motor exhaust vents 223 and out to the atmosphere through lower external housing air motor exhaust vents 224. Also, at initial connection to compressed fluid conditions, pecking controller drill piston chamber vent passage 284 and pecking controller metered flow vent passage 285 are blocked off by pecking controller piston pressure-flow o'rings 283. At this point, the pecking cycle would not be effective, even if enabled.

Further, considering pre-start normal shut-off mode conditions, and considering the machine tool axial force regulation system, this system provides for the amount of axial force applied to the machine cutting or drilling tool 233 only after the start-up of the automated drilling apparatus 200 has commenced. Initially, when connecting compressed air supply system 100, fluid entering supply fluid inlet 201 is channeled to supply fluid valve upper piston chamber 203, and travels through the supply fluid valve piston inlet and flow passage 239. However, until start-up, the pressurized fluid flow traveling through supply fluid valve piston inlet and flow passage 239 is blocked by supply fluid valve piston seat 261.

Therefore, when first connecting compressed air supply system 100 to automated drilling apparatus 200, there is no compressed fluid flow supplied to supply fluid valve piston connection flow passage 221, which would have provided pressurized flow to drill piston upper chamber 251 through drill piston upper chamber pressure orifice 254. The pressure in drill piston upper chamber 251 is at ambient conditions, prior to start-up, because venting to the atmosphere is permitted through drill piston upper chamber pressure orifice 254, on through supply fluid valve piston connection flow passage 221, on through fluid driven rotatable motor 225, on through drill piston air motor exhaust vents 223 and to the atmosphere through lower external housing air motor exhaust vents 224.

Let's now consider the start-up mode by the operator after the initial connection of compressed air supply system 100, and after all programmed adjustments have been made. The automated drilling machine 200 has built-in safety anti-start features that can be enabled or disabled by adjustment of the supply fluid valve mid-lower piston chamber vent system 294 which consists of flow passages, built in orifices and a pressure valve. If the safety anti-start feature of the supply fluid valve mid-lower piston chamber vent system 294 is enabled, the operator must first depress its'pressure valve and then depress start valve 273 which is held in place by a start valve locking fastener 271. In the case of machine mounted adapter 299 configuration, start valve 273 may be replaced with an external controller input device which serves the same function as the start valve 273 in venting supply fluid valve upper-mid piston chamber 275.

Once the operator starts the automated drilling apparatus 200, the start valve 273 must remain depressed until automatic shut-off or an emergency shut-down is required, but the pressure valve made integral to supply fluid valve mid-lower piston chamber vent system 294, located on the outside of intermediate external housing 214, can be adjusted to be released after start-up.

Further, when start valve 273 is depressed, pressurized flow in supply fluid valve upper-mid piston chamber 275 is vented through start valve upper-mid piston chamber vent flow passage 274 and on out through a start valve vent passage 272. The venting of pressurized fluid in supply fluid valve upper-mid piston chamber 275 lowers the differential pressure to near zero, while the differential pressure forces in supply fluid valve upper piston chamber 203, supply fluid valve lower-mid piston chamber 276 and supply fluid valve lower piston chamber 259 remain the same as when compressed air was initially connected to automated drilling apparatus 200.

When the safety anti-start feature of the supply fluid valve mid-lower piston chamber vent system 294 is enabled, venting of pressurized fluid in supply fluid valve upper-mid piston chamber 275 will not be sufficient to change the positive differential pressure force, previously described to initially exist across supply fluid valve piston 226, to the extent required to move supply fluid valve piston 226 to the distal end of automated drilling apparatus 200. Therefore, when the operator depresses the pressure valve integral to supply fluid valve mid-lower piston chamber vent system 294, additional pressure is built-up in supply fluid valve lower-mid piston chamber 276 to cause an overriding positive differential pressure force, in the direction of the proximal end of automated drilling apparatus 200, causing supply fluid valve piston 226, which is slidable and axially moveable in upper external housing 210 and intermediate external housing 214, to move back toward supply fluid valve upper piston chamber 203.

This overriding change in differential pressure force which moves supply fluid valve piston 226 back toward the proximal end of automated drilling apparatus 200 permits compressed fluid to flow around supply fluid valve piston seat 261 area and out supply fluid valve piston connection flow passage 221. The movement of supply fluid valve piston 226 back toward supply fluid valve upper piston chamber 203 creates an even greater differential pressure force when supply fluid valve piston seat 261 area is fully exposed to maximum pressure existing in supply fluid valve lower piston chamber 259, when fluid flows through supply fluid valve piston seat diverter holes 220, after which time the pressure valve made integral to supply fluid valve mid-lower piston chamber vent system 294 can be released.

Further, after supply fluid valve piston 226 backs toward supply fluid valve upper piston chamber 203 and flow entered supply fluid valve piston connection flow passage 221, compressed fluid could now travel through drill piston upper chamber pressure orifice 254 to pressurize drill piston upper chamber 251, so as to create a differential pressure force against drill piston housing 219, great enough to override the constant differential pressure force that remains near constant caused by the pressurized flow in the drill piston lower chamber 258, thus causing the drill piston housing 219 to move forward toward safety guide alignment shroud 230. Differential pressure is maintained in drill piston upper chamber 251 by a drill piston primary flow seals 297 as drill piston housing 219 moves forward and back in a slidable axial motion while drill piston primary flow seals 297 remain stationary, attached to intermediate external housing 214.

Forward movement of drill piston housing 219 can be interrupted by releasing the start valve 273, or when vernier depth controller 204 seats on primary controller piston flow inlet seat 240 when primary controller option is used, or when vernier depth controller 204 moving drill piston vent pin 208 forward to its vent position, or during intermittent interruption of the forward movement by the pecking controller.

Compressed fluid flow traveling through supply fluid valve piston connection flow passage 221 also travels to fluid driven rotatable motor 225 on through drill piston air motor exhaust vents 223 and out to the atmosphere through lower external housing air motor exhaust vents 224. The machine tool chuck and gear assembly 228 fixably coupled to drill piston housing 219 and operatively engaged to fluid driven rotatable motor 225 shaft, holds machine cutting or drilling tool 233 and translates rotatable motion from fluid driven rotatable motor 225 and axial movement forces from drill piston housing 219 to the machine cutting or drilling tool 233 to and from the direction of safety guide alignment shroud 230.

Further, after start-up, the machine tool axial force regulation system regulates the axial force on machine cutting or drilling tool 233 by controlling the pressure in drill piston upper chamber 251. When the pressure in drill piston upper chamber 251 is sufficiently high enough, a change in the pressure force level across drill piston housing 219 will cause the machine cutting or drilling tool 233 to move toward the workpiece to be machined. The pressure in drill piston lower chamber 258 is constant at all times, therefore when the machine tool axial force regulation system permits a sufficient increase in the pressure in drill piston upper chamber 251, the axial force balance changes accordingly. This is achieved by means of a force regulator metering flow valve 279 which adjusts the amount of flow that leaves a force regulator metering flow valve vent 281.

The amount of pressurized fluid flow that leaves a force regulator metering flow valve vent 281 can also be optionally controlled by the vernier depth controller system where multi-pressure levels can be introduced into drill piston upper chamber 251 after start-up, so as to cause drill piston housing 219 to move forward toward safety guide alignment shroud 230, first, at a fast speed caused by greater force levels and, then, later at a lower speed caused by lowering the pressure in drill piston upper chamber 251 during the machining operation. These multi-force levels in the machine tool axial force regulation system would be programmed in with the vernier depth controller system through the multi-force regulator flow restrictors and passages system 265.

The amount of flow leaving the force regulator metering flow valve vent 281, after entering a force regulator drill piston chamber flow passages 278, from drill piston upper chamber 251, will be compared to the constant flow that enters drill piston upper chamber pressure orifice 254, and optionally through the multi-force regulator flow restrictors and passages system 265, to determine the differential pressure force that exists to move drill piston housing 219 in one axial direction or the other.

A force regulator flow passage plug 277 keeps the compressed fluid flow from escaping to the atmosphere from the force regulator drill piston chamber flow passages 278. The force regulator flow passage plug 277 can also include an orifice geometry to assist force regulator metering flow valve vent 281 in maintaining various flow vent conditions. The force regulation system determines the axial force placed against drill piston housing 219 toward the distal end of automated drilling apparatus 200 and then, ultimately, the force exerted in an axial drilling between machine cutting or drilling tool 233 and the material to be machined and can be programmed to a single or optionally multi-level force conditions, as a function the vernier depth controller system.

Again, considering start-up conditions, the pecking cycle can be enabled or disabled by adjusting pecking controller flow meter valve 270 to zero flow output. The pecking controller cycle is based on fluidic analog timing functions where metered flow through a volume takes time to build up adequate pressure to trigger a valve or other pneumatic device. The pecking controller could, as an option, be configured with digital fluidic devices, (not shown). By analog timing of pressure build-up in a volume chamber which is made part of pecking controller piston housing upper chamber 267, the pecking controller provides for programmed venting cycles of drill piston upper chamber 251 during the drilling or milling operation.

Fluid entering supply fluid inlet 201 is channeled, after entering a supply fluid valve upper piston chamber 203 and travels through a pecking controller flow meter valve supply inlet 280, which includes an intermediate plug to block flow, so as to cause the flow to enter pecking controller flow meter valve 270. Programmed metered compressed air then travels through pecking controller flow meter valve 270 and into pecking controller piston housing upper chamber 267 which serves a fluidic analog timing volume chamber. The metered flow continues to build up and pressurize the pecking controller piston housing upper chamber 267 until sufficient pressure is reached to override the differential pressure force against pecking controller piston 282 caused by the pressure in drill piston upper chamber 251, which was basically described in the start-up mode.

However, as the pressure builds up in drill piston upper chamber 251 after start-up, we see in the dual piston area geometry, the small piston area at the proximal end and the larger piston area at the distal end of automated drilling apparatus 200, that when sufficient pressure is reached in drill piston upper chamber 251, there is a reversal of the pressure force causing the pecking controller piston 282 to move back toward the proximal end of automated drilling apparatus 200. First, this reversal of direction of pecking controller piston 282 results in pecking controller piston housing upper chamber 267 venting to a lower pressure via interconnecting pecking controller bleed flow passage 268 and pecking controller metered flow vent passage 285. Secondly, as pecking controller piston 282 continues to move back toward the proximal end of automated drilling apparatus 200, pecking controller metered flow vent passage 285 again is sealed off while drill piston upper chamber 251 vents through pecking controller drill piston connector passage 269 and out pecking controller drill piston chamber vent passage 284 causing piston upper chamber 251 pressure to vent to the atmosphere and register near ambient pressure.

Further, as drill piston upper chamber 251 vents through pecking controller drill piston connector passage 269 and out pecking controller drill piston chamber vent passage 284 to the atmosphere, the reduced pressure in piston upper chamber 251 creates an overriding pressure force of drill piston housing 219 toward the proximal direction of automated drilling apparatus 200 caused by the constant pressure force in drill piston lower chamber 258 . This constant pressure force is created by compressed fluid flow being supplied to supply fluid valve upper piston chamber 203 after entering supply fluid inlet 201 and on through drill piston lower chamber upper flow passage 238, drill piston lower chamber mid flow passage 235, and drill piston lower chamber end flow passage 234, so as to pressurize drill piston lower chamber 258 at sufficient pressure and volume and, in adequate time to again obtain overriding differential pressure force to maintain drill piston housing 219 back toward intermediate external housing 214.

Again on the next timing cycle, the pecking controller piston housing upper chamber 267 pressure again rises to cause a reversal of differential pressure force across the pecking controller piston 282, thus again blocking the pecking controller drill piston chamber vent passage 284 and permitting another cycle of drill piston upper chamber 251 pressure build-up and then, there is again a reversal of the differential pressure force across drill piston housing 219, as the pressure in drill piston upper chamber 251 rises to cause a positive differential force across drill piston housing 219 toward the direction of the distal end of automated drilling apparatus 200 and, thus, continuing on the drilling or machining operation. The timing of the cycle is a function of the flow rate programmed by adjustment of pecking controller flow meter valve 270 for a given geometrical configuration of automated drilling apparatus 200.

Now that it has been described how the start up operation works, let's look at the programmed shut-down operational procedure determined by the programmed depth set by adjustment of vernier depth controller 204. First, in considering preferred embodiment first option of utilizing a mechanical vent pin. It was previously shown that the drill piston vent pin 208 was set in a closed mode when drill piston housing 219 was automatically moved back toward the proximal end of automated drilling apparatus 200 after compressed air supply system 100 was connected. With drill piston vent pin 208 moved back toward the proximal end, drill piston vent pin vent interconnecting flow passage 215 pressurized flow cannot escape from drill piston upper chamber 251.

Further, it was shown that, in considering preferred embodiment first option, drill piston vent pin 208 is slidably movable in an axial direction, and when vernier depth controller 204 approached the programmed depth, when traveling on vernier depth controller threaded rod 205, as required for a specific drilling or milling operation, vernier depth controller 204 pushes drill piston vent pin 208 out toward the distal end of automated drilling machine 200. As drill piston vent pin 208 moves outward toward the distal end, pressurized fluid enters drill piston vent pin vent interconnecting flow passage 215 from drill piston upper chamber 251 and escapes to the atmosphere.

Further, as drill piston upper chamber 251 vents through drill piston vent pin vent interconnecting flow passage 215 to the atmosphere, the reduced pressure in piston upper chamber 251 creates an overriding pressure force of drill piston housing 219 in the proximal direction of automated drilling apparatus 200 caused by the constant pressure force in drill piston lower chamber 258 . This constant pressure force is created by compressed fluid flow being supplied to supply fluid valve upper piston chamber 203 after entering supply fluid inlet 201 and on through drill piston lower chamber upper flow passage 238, drill piston lower chamber mid flow passage 235, and drill piston lower chamber end flow passage 234, so as to pressurize drill piston lower chamber 258 at sufficient pressure and volume and, in adequate time to again obtain overriding differential pressure force to maintain drill piston housing 219 back toward intermediate external housing 214, while resetting drill piston vent pin 208 in its shut-off position, as vernier depth controller 204 is moved back by vernier depth controller threaded rod 205 which is attached to drill piston housing 219.

Provision can be made such as described in the shut-down procedures for the primary controller, to be described later herein, to pressurize supply fluid valve upper-mid piston chamber 275 so as to override the differential pressure force across supply fluid valve piston 226 causing supply fluid valve piston 226 to move toward the distal end of automated drilling apparatus 200. The differential pressure force generated by fluid pressure across the respective surface areas causes supply fluid valve piston seat 261 to move forward, toward the distal end and blocks flow to supply fluid valve piston connection flow passage 221. The supply fluid valve piston seat 261 presses against supply fluid valve piston connection flow passage 221 mating seating geometry, thus maintaining the automated drilling apparatus 200 in its normal shut-off position.

In a preferred embodiment second option, let's look at the programmed shut-down operational procedure determined by the programmed depth set by adjustment of vernier depth controller 204 considering the design option of utilizing primary controller system which provides for machine tool depth control, as opposed to that previously described in utilizing drill piston vent pin 208. In either programmed shut-down procedure, the vernier depth controller 204 will continue to be utilized.

The vernier depth controller 204 pressurization in the vernier depth controller bore area 206 is maintained constant and is equal to the supply fluid valve upper piston chamber 203 pressure. Again, as previously described, the vernier depth controller threaded rod 205 is slidably movable in an axial direction and is threadedly disposed and secured to drill piston housing 219 by means of vernier depth controller rod securing threads 217, which are made an integral part of drill piston housing 219 and vernier depth controller threaded rod 205. Therefore, as the drill piston housing 219 moves in one axial direction or another, do does vernier depth controller 204 in concert.

Further, compressed air from supply fluid valve upper piston chamber 203, travels through to vernier depth controller flow passage 213 and into vernier depth controller bore area 206, then through primary controller piston flow inlet seat 240 and on into primary controller piston bore area extension assembly 241. Compressed air then enters a primary controller piston inlet flow vent area 242 which has a restricted flow geometry that vents to the atmosphere to permit the maintenance of sufficient pressure to maintain primary controller piston 244 in a position toward primary controller piston flow pressurization passage 255.

Primary controller piston 244 is initially moved toward the distal end of automated drilling apparatus 200 during pre-start conditions because fluid flow is supplied at sufficient pressure and volume and, in adequate time, to supply primary controller piston bore area extension assembly 241 area with pressurized flow prior to permitting an overriding pressure force being generated in a primary controller piston constant pressure chamber 250. The pressure supplied to primary controller piston constant pressure chamber 250 is a function of pressurized flow from primary controller piston constant flow control orifice 257 flow rate as compared to the larger size flow area of a primary controller piston constant flow vent orifice 256. Primary controller piston constant flow vent orifice 256 can be adjustable, if required, as can all orifices providing control functions for the automated drilling apparatus 200.

As an alternative, and to further assure that primary controller piston constant pressure chamber 250 pressure rise lags, the pressure rise in primary controller piston bore area extension assembly 241, primary controller piston constant pressure chamber 250 could be pressurized from supply fluid valve piston connection flow passage 221, which did not receive pressurized flow until the automated drilling apparatus 200 was commanded to commence its programmed operation. The alternative fluid flow passages are not shown.

When vernier depth controller 204 reaches the programmed depth, when traveling on vernier depth controller threaded rod 205, as required for a specific drilling or milling operation, vernier depth controller 204 closes off primary controller piston flow inlet seat 240 leaving pressurized fluid in primary controller piston bore area extension assembly 241 to vent to ambient pressure via primary controller piston inlet flow vent area 242. This creates a reversal of the differential pressure force across primary controller piston 244 causing the primary controller piston 244 to move toward vernier depth controller bore area 206 firmly seated on secondary flow area created by primary controller piston bore area extension assembly 241 seat area, which is smaller in area than the distal end area of primary controller piston 244.

When primary controller piston 244 moved to the distal end and firmly seated on secondary flow area created by primary controller piston bore area extension assembly 241 seat area, the positive differential pressure force created by the pressure and larger force area in primary controller piston constant pressure chamber 250 maintains the position of primary controller piston 244 until shut-down. Further, when primary controller piston 244 moves to the distal end, primary controller drill piston chamber vent 247 permits compressed fluid flow to vent from drill piston upper chamber 251 via drill piston upper chamber vent passage 249.

Further, as drill piston upper chamber 251 vents through drill piston upper chamber vent passage 249 and out to the atmosphere through primary controller drill piston chamber vent 247, the reduced pressure in piston upper chamber 251 creates an overriding pressure force of drill piston housing toward the proximal direction of automated drilling apparatus 200 caused by the constant pressure force in drill piston lower chamber 258. This constant pressure force is created by compressed fluid flow being supplied to supply fluid valve upper piston chamber 203 after entering supply fluid inlet 201 and on through drill piston lower chamber upper flow passage 238, drill piston lower chamber mid flow passage 235, and drill piston lower chamber end flow passage 234, so as to pressurize drill piston lower chamber 258 at sufficient pressure and volume and, in adequate time to again obtain overriding differential pressure force to maintain drill piston housing 219 back toward intermediate external housing 214, as vernier depth controller 204 is moved back by vernier depth controller threaded rod 205 which is attached to drill piston housing 219.

Further, when primary controller piston 244 moved to the distal end, compressed fluid flow entering primary controller piston flow inlet seat 240 via vernier depth controller bore area 206 can now travel to both flow passages to fluid supply upper-mid piston chamber 245 and flow passages to drill upper piston chamber 246. The flow passages to fluid supply upper-mid piston chamber 245 are designed to permit metered flow to enter supply fluid upper-mid piston chamber 275 and safely vent out through start valve upper-mid piston vent flow passage 274 without shutting the automated drilling apparatus 200 down, as long as there was free flow out through flow passages to drill upper piston chamber 246 after the vernier depth controller 204 reaches its programmed axial distance within vernier depth controller bore area 206.

Automatic shut-down of the automated drilling apparatus 200 finally occurs when drill piston housing 219 reaches its reset position and blocks the entrance to flow passages to drill upper piston chamber 246 causing a pressure increase in both flow passages to drill upper piston chamber 246 and subsequently flow passages to fluid supply upper-mid piston chamber 245, which increases the pressure in supply fluid valve upper-mid piston chamber 275, so as to override the differential pressure force across supply fluid valve piston 226 causing supply fluid valve piston 226 to move toward the distal end of automated drilling apparatus 200. The differential pressure force generated by fluid pressure across the respective surface areas causes supply fluid valve piston seat 261 to move forward, toward the distal end, and block flow to supply fluid valve piston connection flow passage 221. The supply fluid valve piston seat 261 presses against supply fluid valve piston connection flow passage 221 mating seating geometry, thus maintaining the automated drilling apparatus 200 in its normal shut-off position.

Again looking at some of the other components that are integrally coupled to automated drilling apparatus 200, upper-mid-lower external housing bolts 290 and lower external housing bolt threads 296 secure upper external housing 210 and intermediate external housing 214 to lower external housing 218. The drill piston air motor retainer fasteners 262 secure drill piston housing air motor retainer 227 to drill piston housing 219 after fluid driven rotatable motor 225 and machine tool chuck and gear assembly 228 are installed in drill piston housing 219 internal geometry designed to match a specific fluid driven rotatable motor 225 and machine tool chuck and gear assembly 228 specifications.

The machine tool chuck and gear assembly 228 fixably coupled to drill piston housing 219 and operatively engaged to fluid driven rotatable motor 225 shaft, holds machine cutting or drilling tool 233 and translates rotatable motion from fluid driven rotatable motor 225 and axial movement forces from drill piston housing 219 to the machine cutting or drilling tool 233 to and from the direction of safety guide alignment shroud 230.

Further, safety guide shroud locking fasteners 260 secure the safety guide alignment shroud 230 to lower external housing 218. Safety guide shroud locking fasteners 260 can be set screw type fasteners or fasteners similar to thumb nuts or other type fasteners. A safety guide alignment shroud attachment area 231 permits the attachment of an alignment plate or fixture, so as to permit hand-held drilling operations at a particular angle of attack for the machine or drilling tool 233. A safety guide alignment shroud drill bit passage 232 is designed for clearance around a range of machine or drilling tool 233 sizes. A safety guide alignment shroud chip removal holes 229 permit material chips to remove themselves during the operation of the automated drilling apparatus 200.

Safety guide alignment shroud 230 is described with safety guide alignment shroud chip removal holes 229, but it is also envisioned that safety guide alignment shroud 230 can be sealed and even purged with air or an inert gas to provide safe working operation in an explosive environment where concern for heat or sparks exist such as a health hazard to the operator exist.

Safety guide alignment shroud 230 can also be equipped with an attachment that provides for an alignment base and attaches to safety guide alignment shroud attachment area 231. Further, safety guide alignment shroud 230 can also be equipped with an attachment that will hold the automated drilling apparatus 200 to the workpiece being drilled or machined. The holding apparatus, which attaches to safety guide alignment shroud attachment area 231 or another area of automated drilling apparatus 200, can be a strap, a chain clamp, a magnetic clamp, a mechanical clamp, a vacuum clamp or other type clamping apparatus.

From the foregoing description, those skilled in the art will appreciate that all of the objects of the present invention are realized. A unique automated drilling apparatus 200 has been shown and described which can be utilized in industrial settings and in the field. While specific embodiments have been shown and described, many variations are possible. The terms air, compressed air, fluid and compressed fluid have been intermixed herein and should be interpreted as compressed gaseous fluid. The device can be manufactured in different sizes by scaling the design up or down. The use of drilling is considered generic and it is envisioned that the automated drilling apparatus 200 can be used in drilling, machining, milling grinding and other similar machine mounted or hand-held portable industrial applications.

The apparatus can be manufactured of various materials which exhibit desirable operating characteristics, such as lightweight, durable metals or plastics. A digital fluidic device timing means may provide the timing function. Various power sources may be used and interface devices, such as electrical, hydraulic, and hybrids will complement the operation.

Having described the invention in detail, those skilled in the art will appreciate that modifications may be made the invention without departing from its spirit. Therefore, it is not intended that the scope of the invention be limited to the specific embodiments illustrated and described.

What is claimed is:

1. An integrated automated drilling apparatus comprising:
    an integrated drive-feed mechanism comprising an external housing, a separate drill piston housing, rotatable drive means in said drill piston housing and a rotatable drive means shaft coupled to said drive means, said drill piston housing slidably and axially disposed within said external housing so that a rotatable motion and axial force are produced, where said external housing comprises one or more pressurization chambers defined within said external housing at a location where the drill piston housing is located where said chambers, when unequally pressurized, create a differential pressure force to exist across said drill piston housing;
    a chuck assembly fixably coupled to said drill piston housing and operatively engaged to said rotatable drive means shaft, said chuck assembly securing a tool and translating rotatable motion and axial movement forces to said tool for machining operations; and
    a control system, integral to, and disposed within said integrated drive-feed mechanism external housing for controlling said machine operations and methods for its use.

2. The apparatus of claim 1 wherein said machining operation includes milling, drilling, or grinding.

3. The apparatus of claim 1 wherein said drill piston housing is slidably disposed within said external housing.

4. The apparatus of claim 1 wherein said automated drilling apparatus is adapted for portable operation.

5. The apparatus of claim 1 wherein said external housing further comprises a detachable mounting bracket for use in machine mount operations.

6. The apparatus of claim 1 wherein said external housing further comprises a detachable guide means.

7. The apparatus of claim 1 wherein said external housing further comprises one or more pressurization chambers defined within said external housing at a location where said drill piston housing is located, wherein said pressurization chambers are in fluid communication with a source of pressurized fluid.

8. The apparatus of claim 1 further comprising pressure seals disposed externally on said drill piston housing to prevent pressurized fluid from escaping said pressurization chambers during axial movement.

9. The apparatus of claim 8 wherein said pressurization chambers, when unequally pressurized, cause a differential pressure force to exist across said drill piston housing, so as to cause axial movement of said drill piston housing in the direction of the pressurization chamber with the lowest pressure, so as to move said machine tool toward the workpiece and then away from the workpiece when the machining operation is completed.

10. The apparatus of claim 1 wherein said chuck assembly further comprises a shaft for coupling to said rotatable drive means shaft.

11. The apparatus of claim 10 wherein said chuck assembly is axially and slidably coupled to said rotatable drive means shaft by means of an engagement means coupled to said chuck assembly shaft.

12. The apparatus of claim 1 further including means to prevent the rotation of the drive means relative to said drill piston housing.

13. The apparatus of claim 1 wherein said control system is programmable.

14. The apparatus of claim 1 wherein said control system is integrally incorporated in said external housing.

15. The apparatus of claim 1 wherein said control system is operatively engaged to a supply fluid valve piston means slidably disposed within said external housing, wherein said supply fluid valve piston means supplies compressed air to said integrated drive-feed mechanism.

16. The apparatus of claim 1 operable from a source of compressed air.

17. An integrated automated drilling apparatus comprising:
    an integrated programmable control system for controlling the operation of said apparatus for said robotic drilling of holes, milling operations or other machine operations, comprising control flow passages and control elements
    an integrated drive-feed mechanism comprising an external housing, a drill piston housing, rotatable drive means and a rotatable drive means shaft in said drill piston housing, said drill piston housing slidably and axially disposed within said external housing so that a rotatable motion and axial force are produced;
    a chuck assembly fixably coupled to said drill piston housing and operatively engaged to said rotatable drive means shaft, said chuck assembly securing a tool and translating rotatable motion and axial movement forces to said tool for machining operations;

an integrated supply fluid valve piston slidably disposed within said external housing, a supply fluid valve seat disposed within said external housing, said supply fluid valve piston moves axially within said external housing to seat on said supply fluid valve seat to provide a compressed air shut-off system integrated within said external housing, wherein said compressed air is supplied to said control system and supply fluid valve piston through a pressure flow line;

a vernier depth controller mechanism disposed within said external housing, for pre-setting the depth of said tool;

a fluid supply system comprising a plurality of integrated pressure-flow passages operably coupled to said external housing, said fluid system conveying fluid to said control system to circulate fluid pressurization chambers, to said control system components, and to said integrated supply fluid valve piston;

two or more pressurization chambers defined within said external housing, wherein said pressurization chambers are in fluid connection with a source of pressurized fluid where said chambers, when unequally pressurized create a differential pressure force across said fluid valve piston so as to cause axial movement of said fluid valve piston in the direction of the pressurization chamber with the lowest pressure;

an input connection interface means disposed in said external housing to permit attachment of input devices to interface with the integrated control system components; and an output connection interface means disposed in said external housing to permit control of external machinery or other control systems.

18. The apparatus of claim 17 wherein said control system components are integral with said external housing.

19. The apparatus of claim 17 wherein said control system is adapted to receive input and output from external controllers.

20. The apparatus of claim 19 wherein said output means and said input means connection interfaces comprise a threaded, twist type lock.

21. The apparatus of claim 17 wherein said vernier depth controller mechanism disposed within said external housing is threadably coupled to permit vernier adjustment for setting the depth of said tool with respect to workpiece to be machined.

22. The apparatus of claim 17 wherein said vernier depth controller mechanism utilizes a drill piston vent pin mechanism.

23. The apparatus of claim 17 wherein said compressed air is supplied to said programmable control system and supply fluid valve piston through a pressure-flow line releasably coupled to said external housing.

24. The apparatus of claim 23 wherein said pressurization chambers, when unequally pressurized, create a differential pressure force to exist across said supply fluid valve piston, so as to cause axial movement of said supply fluid valve piston in the direction of the pressurization chamber with the lowest pressure.

25. The integrated programmable control system apparatus of claim 24 further comprising:

an inlet portal through which pressurized air is fed into the external housing; and one or more diagnostic ports disposed in said external housing to measure pressure throughout the system.

26. The apparatus of claim 17 wherein said external housing comprises one or more pressurization chambers defined within said external housing at a location where said supply fluid valve piston is located, wherein said pressurization chambers are in fluid communication with a source of pressurized fluid.

27. The apparatus of claim 17 further comprising pressure seals disposed externally on said supply fluid valve piston to prevent pressurized fluid from escaping said pressurization chambers during axial movement.

28. The apparatus of claim 27 wherein said supply fluid valve piston slidably disposed within said external housing moves axially away from said supply fluid valve seat to provide said compressed air supply to said apparatus, wherein said supply fluid valve piston is caused to move by a differential pressure force.

29. The apparatus of claim 17 wherein said supply fluid valve piston is slidably disposed within said external housing between a first and second position, where the movement of said piston is induced by differential fluid pressure between an upper supply valve and a lower supply valve pressurization chamber.

30. The apparatus of claim 17, wherein said compressed air is supplied to said programmable control system and supply fluid valve piston through a pressure-flow line releasably coupled to said external housing.

31. The apparatus of claim 30 wherein said pressurization chambers, when unequally pressurized, create a differential pressure force to exist across said supply fluid valve piston, so as to cause axial movement of said supply fluid valve piston in the direction of the pressurization chamber with the lowest pressure.

32. The integrated programmable control system of claim 31 wherein said programmable multi-force level controller disposed within said external housing is programmable so as to permit the operator to set the axial force to which said tools are subjected during said machining process by means of controlling the differential pressure force across said drill piston housing via controlling the pressure level in a upper drill piston pressurization chamber and a lower drill piston pressurization chamber.

33. The apparatus of claim 17 operable from a source of compressed air.

34. An integrated programmable control system for controlling the operation of said automated drilling apparatus, wherein said automated drilling apparatus comprises an integrated drive-feed mechanism including a chuck assembly, a rotatable drive means, an external housing and two or more pressurization chambers, a drill piston housing, an integrated supply fluid valve piston, a rotatable drive means shaft in said drill piston housing, said drill piston housing slidably and axially disposed within said external housing, so that a rotatable motion and axial force are produced, said chuck assembly fixably coupled to said drill piston housing and operatively engaged to said rotatable drive means shaft, said chuck assembly securing a tool and translating rotatable motion and axial movement forces so that various drilling or milling functions are achieved when a differential axial force is produced, so as to circulate pressurized fluid to specific areas under specific conditions, said integrated programmable control system comprising:

a quick disconnect assembly through which compressed air flows to said automated drilling apparatus, said quick disconnect assembly releasably coupled to said external housing;

a fluid supply valve piston which is slidably moveable in an axial direction within said external housing, said fluid supply valve piston seats on a supply fluid valve piston seat to block the flow of said compressed air supply;

a fluid supply system comprising a plurality of pressure-flow passages operably disposed within and integrally coupled to said external housing, said fluid system conveying fluid to said control system to circulate fluid pressurization chambers and said integrated programmable control system components and said supply fluid valve piston;

a start valve disposed within said external housing which permits an operator to start the circulation of compressed air to said integrated programmable control system and said drive means;

a programmable vernier depth controller disposed within said external housing to permit the operator to program in the desired depth that the tool, drill bit or milling tool will penetrate the material to be machined, with said tool moving in both a rotatable and axial direction during the machining process;

a programmable pecking cycle controller disposed within said external housing to permit the operator to program in the desired depth that the tool will penetrate the material for a preset time period, said pecking controller repeating its cycle until such time as said depth controller indicates that the desired axial depth is reached, with said tool moving in both a rotatable and axial direction during the machining process;

one or more diagnostic ports disposed within said external housing which permits measurement of pressure points in the control and compressed air supply systems;

an input connection interface means disposed in said external housing to permit attachment of input devices to interface with the integrated control system components;

an output connection interface means disposed in said external housing to permit control of external machinery or other control systems; and a programmable multi-force level controller disposed within said external housing which is programmable, so as to permit the operator to set the axial force to which said tools are subjected during said machining process.

35. The integrated programmable control system of claim 34 wherein said control system input signal is adapted to be received via a transducer.

36. The integrated programmable control system of claim 35 wherein said transducer will convert said control system input signal to a pneumatic input where required.

37. The integrated programmable control system apparatus of claim 34 further including control system components disposed within said external housing and comprising one or more fluid flow passages operatively disposed with respect to said supply fluid valve piston pressurization chambers and drill piston housing pressurization chambers.

38. The integrated programmable control system apparatus of claim 34 disposed further including within an external housing along with said supply fluid valve piston.

39. An integrated automated drilling apparatus comprising:

an integrated drive-feed mechanism comprising an external housing, a separate drill piston housing, rotatable drive means including a rotatable drive means shaft coupled to said drive means, said drill piston housing disposed within said external housing so that a rotatable motion and axial force are produced, where said external housing comprises one or more pressurization chambers defined within said external housing at a location where the drill piston housing is located where said chambers, when unequally pressurized, create a differential pressure force to exist across said drill piston housing;

a chuck assembly operatively engaged to said rotatable drive means shaft, said chuck assembly securing a tool and translating rotatable motion and axial movement forces to said tool for machining operations; and a control system, integral to, and disposed within said integrated drive-feed mechanism external housing for controlling said machine operations.

\* \* \* \* \*